(12) United States Patent
Raha et al.

(10) Patent No.: US 12,511,942 B2
(45) Date of Patent: Dec. 30, 2025

(54) DETECTING WRAPPED ATTACKS ON FACE RECOGNITION

(71) Applicant: Rakuten Group, Inc., Tokyo (JP)

(72) Inventors: Poulami Raha, Karnataka (IN); Yeongnam Chae, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 435 days.

(21) Appl. No.: 17/877,168

(22) Filed: Jul. 29, 2022

(65) Prior Publication Data
US 2024/0037995 A1 Feb. 1, 2024

(51) Int. Cl.
| G06K 9/00 | (2022.01) |
| G06F 21/55 | (2013.01) |
| G06V 10/774 | (2022.01) |
| G06V 10/82 | (2022.01) |
| G06V 40/16 | (2022.01) |
| G06V 40/40 | (2022.01) |

(52) U.S. Cl.
CPC ............ *G06V 40/45* (2022.01); *G06F 21/554* (2013.01); *G06V 10/774* (2022.01); *G06V 10/82* (2022.01); *G06V 40/168* (2022.01); *G06V 40/172* (2022.01); *G06F 2221/031* (2013.01)

(58) Field of Classification Search
CPC ...... G06V 40/45; G06V 10/774; G06V 10/82; G06V 40/168; G06V 40/172; G06V 40/16; G06F 21/554; G06F 2221/031
See application file for complete search history.

(56) References Cited

U.S. PATENT DOCUMENTS

| 11,443,559 | B2 * | 9/2022 | Vorobiev | G07D 7/206 |
| 2019/0287217 | A1 * | 9/2019 | Cooke | G06N 3/045 |
| 2020/0074148 | A1 * | 3/2020 | Xu | G06F 18/214 |
| 2020/0349372 | A1 | 11/2020 | Lee et al. | |
| 2020/0364478 | A1 | 11/2020 | Zhang et al. | |
| 2020/0410267 | A1 | 12/2020 | Bao et al. | |
| 2021/0224606 | A1 | 7/2021 | Lee et al. | |
| 2021/0397198 | A1 * | 12/2021 | Soltani Bozchalooi | |
| | | | | G06N 20/00 |
| 2024/0021014 | A1 | 1/2024 | Lee et al. | |

FOREIGN PATENT DOCUMENTS

| CN | 110659582 A | * | 1/2020 | ........... G06F 16/583 |
| JP | 2020-184331 A | | 11/2020 | |
| JP | 2020-535529 A | | 12/2020 | |
| JP | 2021-117968 A | | 8/2021 | |
| JP | 2021-519962 A | | 8/2021 | |

OTHER PUBLICATIONS

Japanese Office Action dated Jul. 30, 2024 in Application No. 2023-100509.

* cited by examiner

*Primary Examiner* — Xin Jia
(74) *Attorney, Agent, or Firm* — Sughrue Mion, PLLC

(57) ABSTRACT

Provided are a method, device, and system for generating a liveness detection dataset, training a liveness detection model, and performing liveness detection. The method includes: obtaining a plurality of real images of faces; providing the plurality of real images to a neural network; generating a plurality of synthetic images corresponding to the plurality of real images based on an output of the neural network; and training a liveness detection model based on the plurality of real images and the plurality of synthetic images, wherein the liveness detection model is used to perform liveness detection by determining whether an input image of a face includes a live image of the face.

18 Claims, 18 Drawing Sheets

| Database | Distance | APCER (%) | BPCER (%) | ACER (%) | EER (%) |
|---|---|---|---|---|---|
| Print | Close | 5.0 | 0.00 | 2.50 | 0.14 |
| Paper Mask | Mid | 5.0 | 0.00 | 2.50 | 0.00 |
| Glossy | Close | 5.0 | 0.00 | 2.50 | 0.00 |
| Paper Mask | Mid | 5.0 | 0.00 | 2.50 | 0.00 |
| CASIA-SURF | NA | 5.0 | 5.39 | 5.17 | 5.20 |
| Print | Close | 5.0 | 0.42 | 2.71 | 0.42 |
| Paper Mask | Mid | 5.0 | 0.00 | 2.50 | 0.00 |
| Glossy | Close | 5.0 | 0.00 | 2.50 | 0.00 |
| Paper Mask | Mid | 5.0 | 0.00 | 2.50 | 0.00 |
| CASIA-SURF | NA | 5.0 | 6.86 | 5.90 | 5.65 |

FIG. 8E

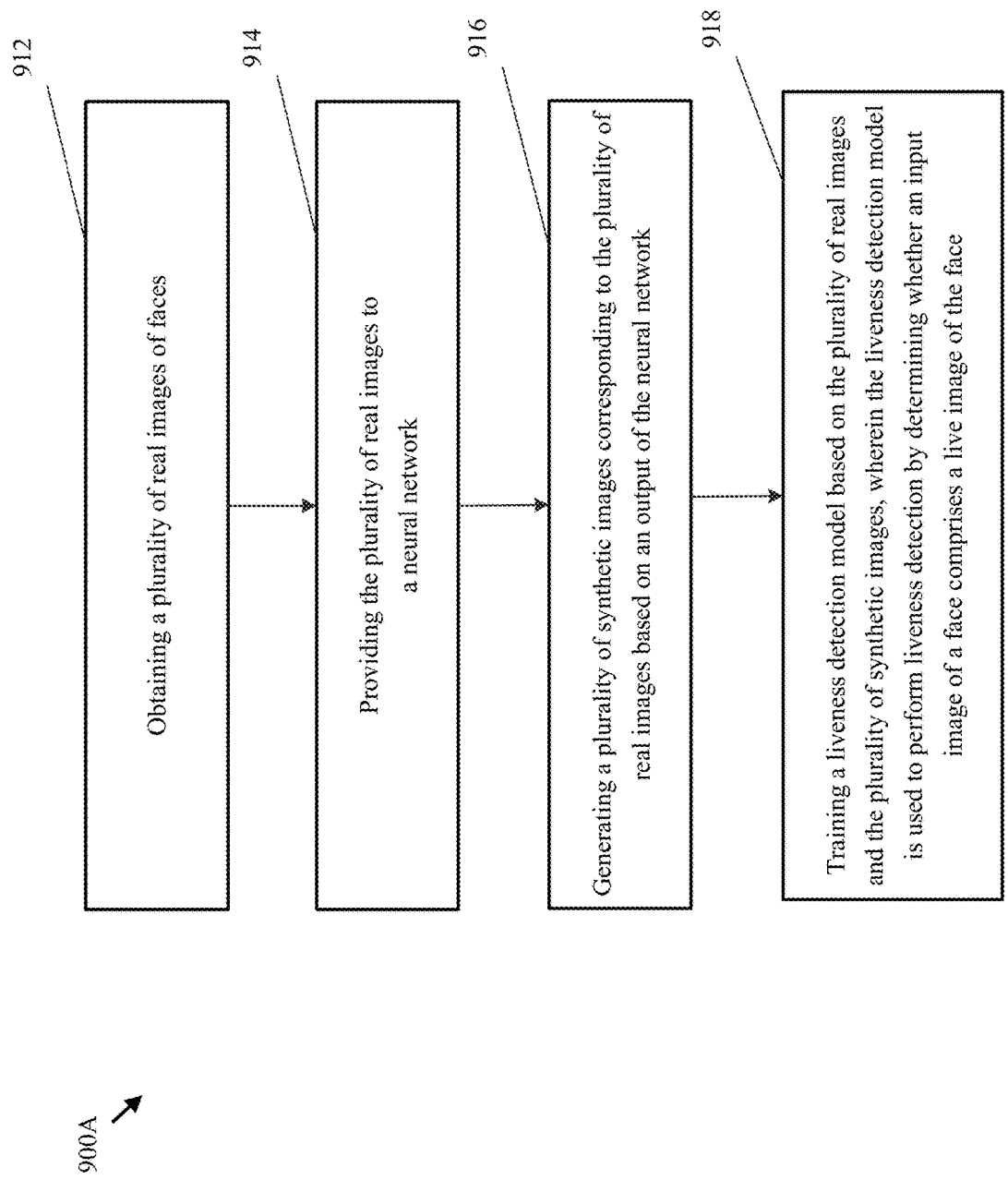

DETECTING WRAPPED ATTACKS ON FACE RECOGNITION

BACKGROUND

1. Field

The disclosure relates to wrap attack detection, and more particularly to using machine learning or deep learning techniques to generate training data for wrap attack detection, and to perform wrap attack detection based on the training data.

2. Description of Related Art

Biometric authentication has been recently used either in place of, or in addition to, traditional authentication approaches due to increased security and user convenience. Biometric authentication may be performed based on many different biometric characteristics, for example iris, fingerprint, vein and facial characteristics. In particular, facial characteristics may be used for biometric authentication in many applications such as identity management, online payment, access control, automotive applications and active authentication on mobile devices, computers or other devices.

Related art biometric systems, however, are vulnerable to various types of presentation attacks, i.e., fraudulent presentations to a biometric capture subsystem, for example a camera, with the goal of deceiving or otherwise interfering with the operation of the biometric system. For example, artefacts that artificially represent a copy of a biometric characteristic, such as a face, may be presented to biometric systems to spoof a registered user and authenticate an attacker.

Examples of presentation attacks include two-dimensional (2D) attacks such as print attacks, in which a printed photograph of a registered user (e.g., face image) may be presented, and display attacks in which an image of a registered user is presented via a display device such as a mobile phone, and video attacks in which a video of a registered user is presented.

Related art liveness detection schemes employ various presentation attack detection mechanisms to automatically detect and prevent a presentation attack. Such mechanisms may include a facial detection by depth map analysis that creates a 3D facial depth map for verifying a user, and thermal imaging-based facial liveness detection that verifies a user based on a real-time thermal image. These mechanisms, however, have various drawbacks. For example, the 3D facial depth analysis and thermal imaging-based facial liveness detection both incur excessive cost and complexity resulting from additional required sensors (e.g., a thermal camera, RGB-D image sensors).

In addition, these depth-based or thermal-based mechanisms may be vulnerable to other examples of presentation attacks, for example three-dimensional (3D) attacks such as wrap attacks in which inexpensive, easily available printed masks may be worn or otherwise presented by an attacker to spoof a registered user.

SUMMARY

Provided are a method of generating a liveness detection training dataset and training a liveness detection model based on the liveness detection training dataset. Also provided are a method, device, and system for performing liveness detection.

In accordance with an aspect of the disclosure, a method of training a liveness detection system includes obtaining a plurality of real images of faces; providing the plurality of real images to a neural network; generating a plurality of synthetic images corresponding to the plurality of real images based on an output of the neural network; and training a liveness detection model based on the plurality of real images and the plurality of synthetic images, wherein the liveness detection model is used to perform liveness detection by determining whether an input image of a face includes a live image of the face.

The neural network may include a variational autoencoder—generative adversarial network (VAE-GAN).

The plurality of synthetic images may include at least one synthetic wrap attack image.

The at least one synthetic wrap attack image is generated using a wrap attack parameter.

A first value of the wrap attack parameter may indicate that the at least one synthetic wrap attack image may include a planar face image corresponding to a flat mask, and a second value of the wrap attack parameter indicates that the at least one synthetic wrap attack image may include a wrapped face image corresponding to a wrapped mask.

The plurality of real images may include a plurality of first real images having a first value of the wrap attack parameter, and a second plurality of real images having a second value of the wrap attack parameter, and based on the plurality of first real images and the plurality of second real images, the at least one synthetic wrap attack image may be generated to have a third value of the wrap attack parameter.

The training of the liveness detection model may include: extracting features from the plurality of real images and the plurality of synthetic images using a feature extractor; and training the liveness detection model based on the extracted features.

A discriminator included in the neural network may be used as the feature extractor after the plurality of synthetic images are generated.

The liveness detection model may include a support vector machine (SVM).

In accordance with an aspect of the disclosure, a method of performing liveness detection includes obtaining an input image of a face; providing information about the input image to a liveness detection model; determining, based on an output of the liveness detection model, whether the input image is a live image of the face, wherein the liveness detection model is trained using a plurality of real images of faces and a plurality of synthetic images, and wherein the plurality of synthetic images are generated by a neural network based on the plurality of real images.

The neural network may include a variational autoencoder—generative adversarial network (VAE-GAN).

The information about the input image may include at least one feature of the input image, and the at least one feature may be extracted using a feature extractor.

The feature extractor may include a discriminator included in the neural network after the plurality of synthetic images are generated.

The input image of the face may include at least one frame of a video.

The liveness detection model may include a support vector machine (SVM).

In accordance with an aspect of the disclosure, a device for performing liveness detection includes a memory configured to store instructions; and at least one processor configured to execute the instructions to: obtain an input image of a face; provide information about the input image to a liveness detection model; determine, based on an output of the liveness detection model, whether the input image is a live image of the face, wherein the liveness detection model is trained using a plurality of real images of faces and a plurality of synthetic images, and wherein the plurality of synthetic images are generated by a neural network based on the plurality of real images.

The neural network may include a variational autoencoder—generative adversarial network (VAE-GAN)

The plurality of synthetic images may include at least one synthetic wrap attack image.

The information about the input image may include at least one feature of the input image, and the at least one feature may be extracted using a feature extractor.

The feature extractor may include a discriminator included in the neural network after the plurality of synthetic images are generated.

The input image of the face may include at least one frame of a video.

The liveness detection model may include a support vector machine (SVM).

In accordance with an aspect of the disclosure, a non-transitory computer-readable medium stores instructions that, when executed by one or more processors of a device for performing liveness detection, cause the one or more processors to obtain an input image of a face; provide information about the input image to a liveness detection model; determine, based on an output of the liveness detection model, whether the input image is a live image of the face, wherein the liveness detection model is trained using a plurality of real images of faces and a plurality of synthetic images, and wherein the plurality of synthetic images are generated by a neural network based on the plurality of real images.

The neural network may include a variational autoencoder—generative adversarial network (VAE-GAN).

The plurality of synthetic images may include at least one synthetic wrap attack image.

The information about the input image may include at least one feature of the input image, and the at least one feature may be extracted using a feature extractor.

The feature extractor may include a discriminator included in the neural network after the plurality of synthetic images are generated.

The input image of the face may include at least one frame of a video.

The liveness detection model may include a support vector machine (SVM).

BRIEF DESCRIPTION OF THE DRAWINGS

These and/or other aspects will become apparent and more readily appreciated from the following description, taken in conjunction with the accompanying drawings in which:

FIG. 8E shows experimental results corresponding to a liveness detection system according to an embodiment;

FIG. 9A is a flowchart of a method for generating a liveness detection training dataset and training a liveness detection system, according to an embodiment.

DETAILED DESCRIPTION

Figure 1:
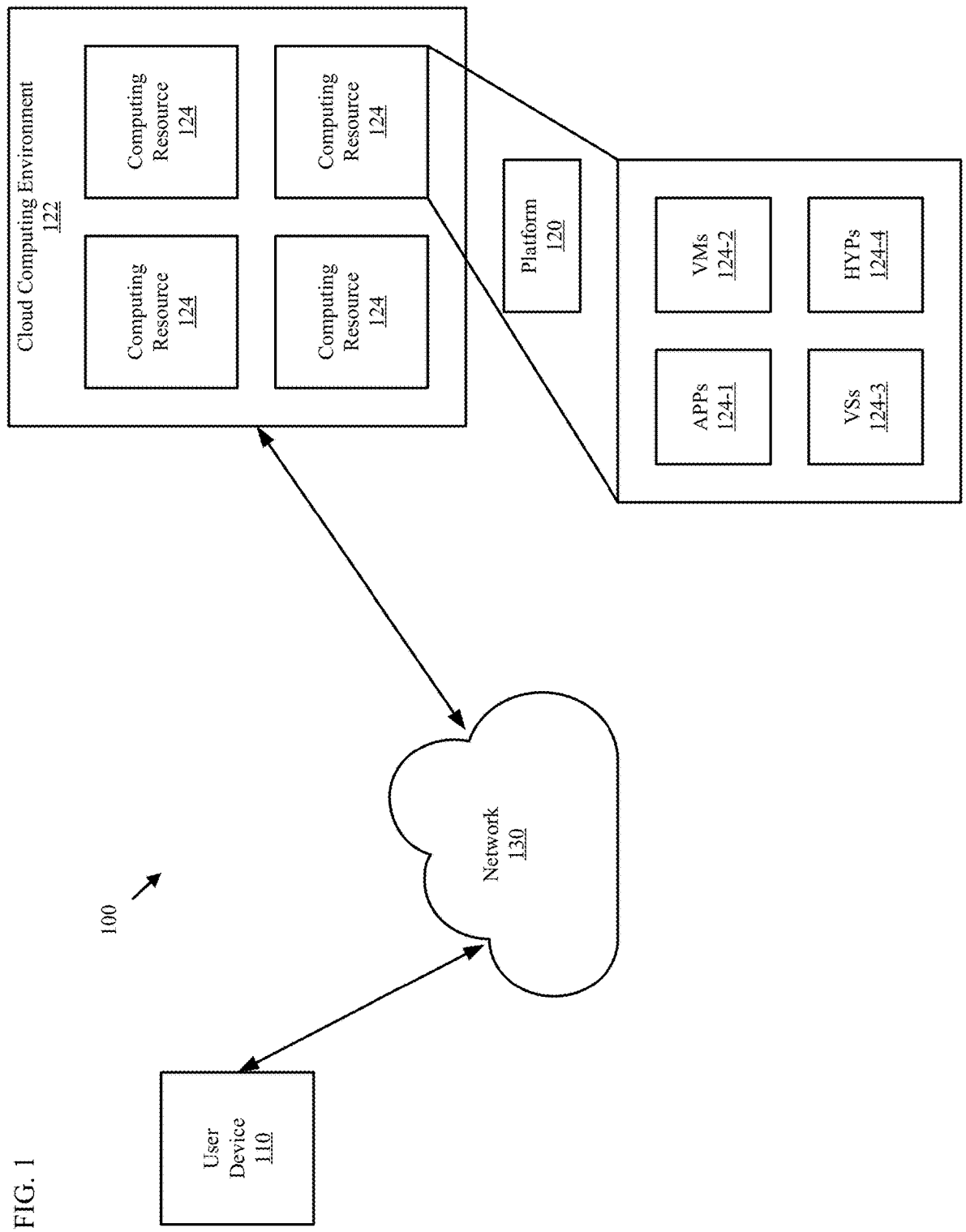
FIG. 1 is a block diagram of an example environment in which systems and/or methods, described herein, may be implemented.

Hereinafter, exemplary embodiments of the disclosure will be described in detail with reference to the accompanying drawings in which like reference numerals refer to like elements throughout. It is understood, however, that the disclosure is not limited to embodiments described herein, and that features and components from one embodiment may be included or omitted in another embodiment.

Further, it is understood that as used herein, expressions such as "at least one of," when preceding a list of elements, modify the entire list of elements and do not modify the individual elements of the list. For example, the expressions "at least one of [A], [B], and [C]" or "at least one of [A], [B], or [C]" means only A, only B, only C, A and B, B and C, A and C, or A, B, and C.

It is also understood that, although the terms "first," "second," etc., may be used herein to describe various elements, these elements should not be limited by these terms (e.g., should not be interpreted as designating a relative order or significance). These terms are only used to distinguish one element from another.

Additionally, as used herein, the singular forms "a," "an" and "the" are intended to include the plural forms as well, unless otherwise indicated explicitly or by the surrounding context.

One or more embodiments of the present disclosure provide methods, devices, and systems for generating training datasets for liveness detection, performing training of a liveness detection model using the generated training dataset, and performing liveness detection using the trained liveness detection model. In embodiments, the liveness detection training dataset and liveness detection model may relate to, or be used for, detecting and preventing presentation attacks such as wrap attacks in which, for example, printed masks may be worn or otherwise presented by an attacker to spoof a registered user of a facial recognition, identification, and/or authentication system in order to gain unauthorized access. In embodiments, wrap attacks may involve wrapping or enfolding at least a portion of a face with a printed mask, for example a paper mask, in order to spoof or fool depth-based detection techniques.

One or more embodiments of the present disclosure may simplify the implementation of such wrap attack prevention techniques. In general, wrap attack detection approaches may rely on the availability of both bona fide samples and attack samples in order to train liveness detection systems to protect against wrap attacks. In embodiments, bona fide samples may also be referred to as real samples or images, or live samples or images, and may correspond to genuine access attempt by an authorized user. In embodiments, attack samples may also be referred to as artefact samples, and may correspond to unauthorized or spoof access attempts or attacks, for example wrap attacks. However, many of the currently-available anti-spoof databases which may be useful as training datasets are intended for non-commercial use or research purposes only.

Therefore, embodiments may relate to methods, devices, and systems for generating liveness detection training datasets, for example training datasets which may assist in detection and prevention of presentation attacks such as wrap attacks. In particular, embodiments may relate to the use of at least one of a neural network (NN), deep NN, machine learning, and deep learning technique to generate liveness detection training datasets. Embodiments may also relate to methods, devices, and systems for training a liveness detection model based on the generated liveness detection training datasets, and performing liveness detection using the trained detection model. In embodiments, the liveness detection model may be a NN, or may be any other type of detection model as desired.

In embodiments, a NN, which may also be referred to as an artificial NN, may include an interconnected group of artificial neurons that uses a mathematical model or computational model for information processing. A NN may be an adaptive system that may change its structure based on external or internal information that flows through the network. NNs can be used to model complex relationships between inputs and outputs or to find patterns in data.

In embodiments, a NN may be used to generate liveness detection training datasets based on publically or commercially available bona fide samples. For example, embodiments may relate to the use of at least one NN from among a variational autoencoder (VAE), generative adversarial network (GAN), and/or a combination thereof, which may be referred to as a VAE-GAN. In embodiments, a VAE-GAN architecture may generate a training dataset, for example a liveness detection training dataset, by using bona fide samples to generate attack samples. In embodiments, the attack samples generated by a NN such as a VAE-GAN may be referred to as synthetic attack samples, which may be based on the bona fide samples but may share characteristics of actual attack samples. In embodiments, the bona fide face images may include bona fide face images, for example from publically or commercially available facial recognition image datasets. In embodiments, the synthetic attack samples may include synthetic wrap attack images, which may be based on the bona fide face images and may have characteristics of actual wrap attack images.

In embodiments, the bona fide samples and the synthetic attack samples may be used to generate a training dataset, which may be used to train a liveness detection model. For example, the training dataset may be a liveness detection training dataset which may include the bona fide face images and the corresponding synthetic wrap attack images.

In embodiments, one or more components of the VAE-GAN may be used to train the liveness detection model, or to perform liveness detection. For example, the VAE-GAN may include elements such as an encoder and a discriminator, and one or more of these components may be useful as a feature extractor which may extract features such as discriminative features or distinctive features of bona fide samples and the synthetic attack samples included in the training dataset, and provide these extracted features to the liveness detection model during training, however embodiments are not limited thereto.

FIG. 1 is a diagram of an example environment 100 in which systems and/or methods, described herein, may be implemented. As shown in FIG. 1, environment 100 may include a user device 110, a platform 120, and a network 130. Devices of environment 100 may interconnect via wired connections, wireless connections, or a combination of wired and wireless connections. In embodiments, any of the functions and operations described with reference to FIG. 1 above may be performed by any combination of elements illustrated in FIG. 1.

User device 110 includes one or more devices capable of receiving, generating, storing, processing, and/or providing information associated with platform 120. For example, user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 110 may receive information from and/or transmit information to platform 120.

Platform 120 includes one or more devices capable of receiving, generating, storing, processing, and/or providing information. In some implementations, platform 120 may include a cloud server or a group of cloud servers. In some implementations, platform 120 may be designed to be modular such that certain software components may be swapped in or out depending on a particular need. As such, platform 120 may be easily and/or quickly reconfigured for different uses.

In some implementations, as shown, platform 120 may be hosted in cloud computing environment 122. Notably, while implementations described herein describe platform 120 as being hosted in cloud computing environment 122, in some implementations, platform 120 may not be cloud-based (i.e., may be implemented outside of a cloud computing environment) or may be partially cloud-based.

Cloud computing environment 122 includes an environment that hosts platform 120. Cloud computing environment 122 may provide computation, software, data access, storage, etc. services that do not require end-user (e.g., user device 110) knowledge of a physical location and configuration of system(s) and/or device(s) that hosts platform 120. As shown, cloud computing environment 122 may include a group of computing resources 124 (referred to collectively as "computing resources 124" and individually as "computing resource 124").

Computing resource 124 includes one or more personal computers, a cluster of computing devices, workstation computers, server devices, or other types of computation and/or communication devices. In some implementations, computing resource 124 may host platform 120. The cloud resources may include compute instances executing in computing resource 124, storage devices provided in computing resource 124, data transfer devices provided by computing resource 124, etc. In some implementations, computing resource 124 may communicate with other computing resources 124 via wired connections, wireless connections, or a combination of wired and wireless connections.

As further shown in FIG. 1, computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

Application 124-1 includes one or more software applications that may be provided to or accessed by user device 110. Application 124-1 may eliminate a need to install and execute the software applications on user device 110. For example, application 124-1 may include software associated with platform 120 and/or any other software capable of being provided via cloud computing environment 122. In some implementations, one application 124-1 may send/receive information to/from one or more other applications 124-1, via virtual machine 124-2.

Virtual machine 124-2 includes a software implementation of a machine (e.g., a computer) that executes programs like a physical machine. Virtual machine 124-2 may be either a system virtual machine or a process virtual machine, depending upon use and degree of correspondence to any real machine by virtual machine 124-2. A system virtual machine may provide a complete system platform that supports execution of a complete operating system ("OS"). A process virtual machine may execute a single program, and may support a single process. In some implementations, virtual machine 124-2 may execute on behalf of a user (e.g., user device 110), and may manage infrastructure of cloud computing environment 122, such as data management, synchronization, or long-duration data transfers.

Virtualized storage 124-3 includes one or more storage systems and/or one or more devices that use virtualization techniques within the storage systems or devices of computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 124-4 may provide hardware virtualization techniques that allow multiple operating systems (e.g., "guest operating systems") to execute concurrently on a host computer, such as computing resource 124. Hypervisor 124-4 may present a virtual operating platform to the guest operating systems, and may manage the execution of the guest operating systems. Multiple instances of a variety of operating systems may share virtualized hardware resources.

Network 130 includes one or more wired and/or wireless networks. For example, network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of environment 100 may perform one or more functions described as being performed by another set of devices of environment 100.

Figure 2:
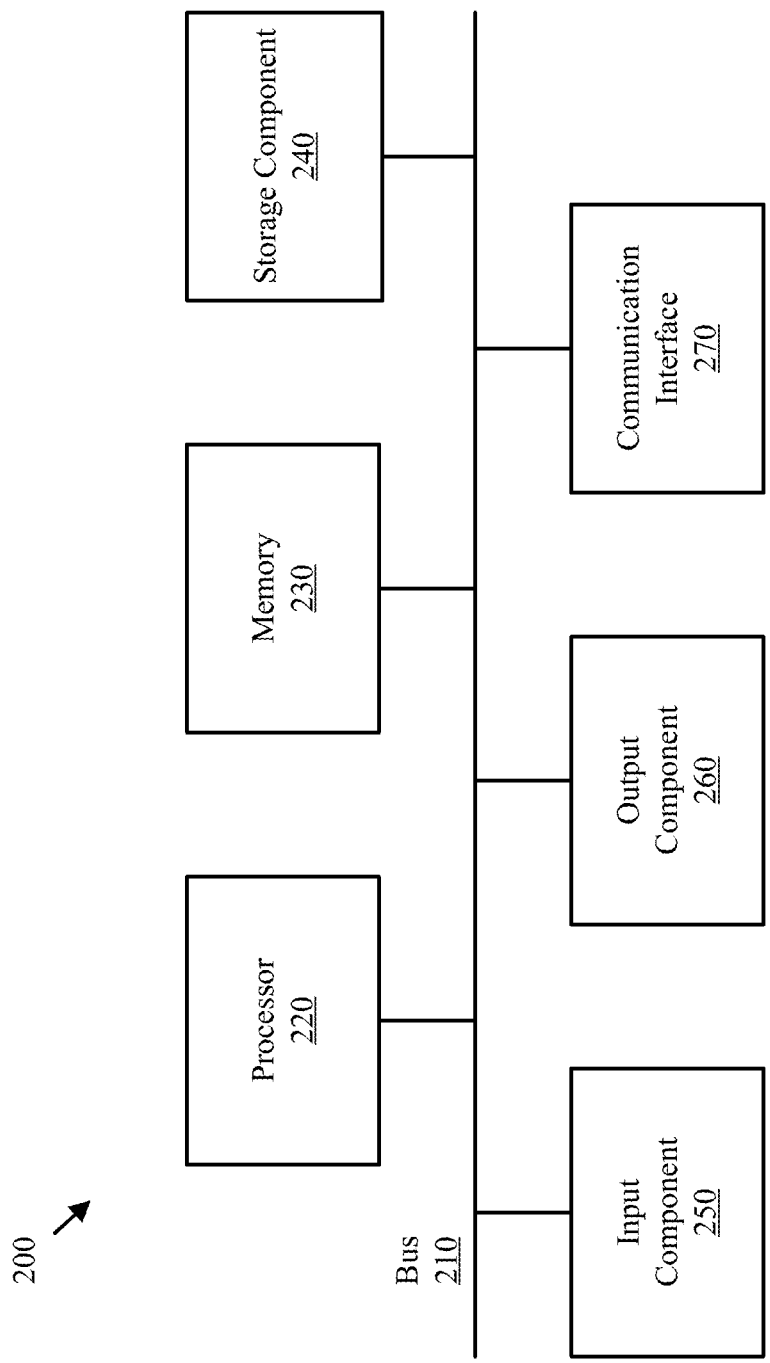
FIG. 2 is a block diagram of example components of a device according to an embodiment.

FIG. 2 is a diagram of example components of a device 200. Device 200 may correspond to user device 110 and/or platform 120. As shown in FIG. 2, device 200 may include a bus 210, a processor 220, a memory 230, a storage component 240, an input component 250, an output component 260, and a communication interface 270.

Bus 210 includes a component that permits communication among the components of device 200. Processor 220 may be implemented in hardware, firmware, or a combination of hardware and software. Processor 220 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 220 includes one or more processors capable of being programmed to perform a function. Memory 230 includes a random access memory (RAM), a read only memory (ROM), and/or another type of dynamic or static storage device (e.g., a flash memory, a magnetic memory, and/or an optical memory) that stores information and/or instructions for use by processor 220.

Storage component 240 stores information and/or software related to the operation and use of device 200. For example, storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 250 includes a component that permits device 200 to receive information, such as via user input (e.g., a touch screen display, a keyboard, a keypad, a mouse, a button, a switch, and/or a microphone). Additionally, or alternatively, input component 250 may include a sensor for sensing information (e.g., a global positioning system (GPS) component, an accelerometer, a gyroscope, and/or an actuator). Output component 260 includes a component that provides output information from device 200 (e.g., a display, a speaker, and/or one or more light-emitting diodes (LEDs)).

Communication interface 270 includes a transceiver-like component (e.g., a transceiver and/or a separate receiver and transmitter) that enables device 200 to communicate with other devices, such as via a wired connection, a wireless connection, or a combination of wired and wireless connections. Communication interface 270 may permit device 200 to receive information from another device and/or provide information to another device. For example, communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

Device 200 may perform one or more processes described herein. Device 200 may perform these processes in response to processor 220 executing software instructions stored by a non-transitory computer-readable medium, such as memory 230 and/or storage component 240. A computer-readable medium is defined herein as a non-transitory memory device. A memory device includes memory space within a single physical storage device or memory space spread across multiple physical storage devices.

Software instructions may be read into memory 230 and/or storage component 240 from another computer-readable medium or from another device via communication interface 270. When executed, software instructions stored in memory 230 and/or storage component 240 may cause processor 220 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, device 200 may include additional components, fewer components, different components, or differently arranged components than those shown in FIG. 2. Additionally, or alternatively, a set of components (e.g., one or more components) of device 200
may perform one or more functions described as being performed by another set of components of device 200.

In embodiments, at least one of the elements discussed above may be used to implement at least one from among a system or device for generating a liveness detection training dataset, a system or device for training a liveness detection model, and a system or device for performing liveness detection, as discussed below with respect to FIGS. 3-9B.

Figure 3:
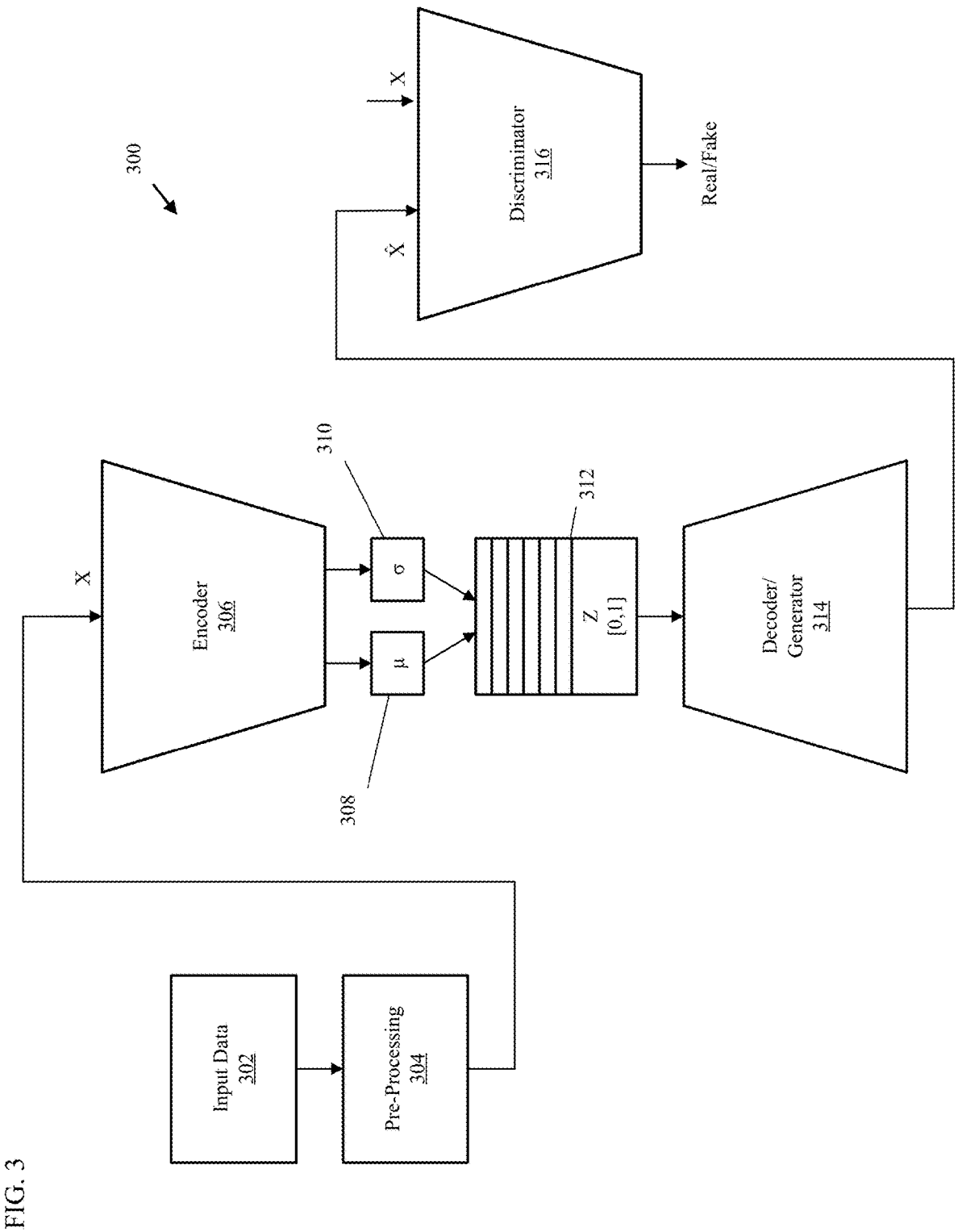
FIG. 3 is a block diagram of an example neural network for generating a liveness detection training dataset according to an embodiment.

FIG. 3 is a block diagram of an example dataset generating system 300 for generating a liveness detection training dataset according to an embodiment. In embodiments, dataset generating system 300 may relate to the use of adversarial discriminative features to identify presentation attacks, for example printed mask attacks or wrap attacks. In embodiments, adversarial discriminative features to reliably detect 2D printed mask or wrap attacks without relying on advanced imaging methodologies such as spectral imaging or RGB-D imaging. Although the examples of FIGS. 3-9B are described below as relating to liveness detection based on face images, embodiments are not limited thereto. It should be understood that embodiments may be used to perform liveness detection or any other detection or discrimination based on any characteristic, for example other biometric characteristics such as iris, fingerprint, or vein characteristics, or any other characteristics as desired.

As discussed above, many related art techniques rely on the availability of training datasets which include both bona fide samples and attack samples. However, such training datasets may be difficult or impossible to obtain in practice. For example, datasets such as the FRGC dataset and the SWAN-MBD may only be available for research or non-commercial purposes.

Therefore, embodiments of the present disclosure may use a NN architecture such as a VAE-GAN architecture to model and exploit latent feature representations of bona fide samples to generate synthetic attack samples. As a result, a training dataset which includes both bona fide samples and attack samples may be generated using only the bona fide samples as input.

In general, NN elements corresponding to a VAE may learn the distribution of input data, which may be for example real or bona fide samples. Because there are differences at the pixel level in bona fide face images and attack images such as wrap attack images, learning or training a VAE over RGB images of bona fide samples may provide robust latent representations of real or bona fide samples only. Thus, passing a real and fake sample through VAE encoder will produce differences in latent representations of these samples. Further, adversarial training using NN elements corresponding to a GAN may help VAE elements to generate synthetic attack samples, using for example added parameters such as parameter Z as discussed in greater detail below.

In embodiments, dataset generating system 300 may receive image data 302, which may include real samples. In embodiments, the real samples may include real face images, for example face images from one or more publically or commercially available facial recognition databases. In embodiments, such a database may include the Face Recognition Grand Challenge (FRGC) dataset, the SWAN Multimodal Biometric Dataset (SWAN-MBD), or any commercially available dataset. In embodiments, input data 302 may include only real or bona fide samples, and may not include any attack samples, however embodiments are not limited thereto.

In embodiments, dataset generating system 300 may include pre-processing module 304, which may perform pre-processing on input data 302. For example, pre-processing module 304 may perform operations such as such as face and landmark detection, scaling, cropping of facial regions, and normalization to restrict the dynamic range of input RGB images to a particular range, for example [0,255]. In embodiments, the real samples included in input data 302 may be pre-processed to increase their suitability as input for generating synthetic attack samples or for inclusion in a training dataset. In embodiments pre-processing module 304 may include NN elements, although embodiments are not limited thereto. For example, pre-processing module 304 may include elements corresponding to a multi-task cascaded convolutional network (MTCNN), or any other type of NN.

In embodiments, the pre-processed real samples may be used as bona fide samples X, which may be provided as input for machine learning NN elements included in dataset generating system 300. In embodiments, dataset generating system 300 may include NN elements which may correspond to a VAE-GAN architecture. For example, dataset generating system 300 may include encoder 306, decoder/generator 314, and discriminator 316. In embodiments, encoder 306 may correspond to an encoder element of a VAE, discriminator 316 may correspond to a discriminator element of a GAN, and decoder/generator 314 may correspond to both a decoder element of the VAE, and a generator element of the GAN.

In embodiments, bona fide images X may be provided as input to encoder 306. An output of encoder 306 may include mean vector 308 and standard deviation vector 310, which may correspond to the bona fide images X. In embodiments, an output of encoder 306 may include vector 312, which may be used as input for decoder/generator 314. In embodiments, in order to generate synthetic attack images, vector 312 may be modified by one or more added parameters, for example parameter Z. In embodiments, added parameters may be used for attack pattern generation.

For example, parameter Z may indicate characteristics of an attack image, which are to be added as one or more synthetic attack images are generated. For example, parameter Z may be a wrap attack parameter, and may indicate, for example, an amount of curvature to be added to one or more synthetic attack images as the one or more synthetic attack images are generated. In embodiments, based on a value of parameter Z being a first value, for example a value of 0, a corresponding synthetic attack image may be generated as a planar image corresponding to a plane printed mask. In embodiments, based on a value of parameter Z being a second value, for example a value of 1, a corresponding synthetic attack image may be generated as a wrapped image, corresponding to a wrapped printed mask. In embodiments, parameter Z may be restricted to discrete values, or may be a range of continuous values which correspond to varying degrees of curvature. In embodiments, parameter Z or other added parameters may be used to add other characteristics of attack images such as wrap attack images. For example, in embodiments parameter Z or other added parameters may be used to add texture, for example textures associated with printed images such as a flat texture or a glossy texture.

In embodiments, during training, samples having a value of 0 for parameter Z, and samples having a value of 1 for parameter Z, may be obtained and used to train the VAE-GAN model. The GAN model may then automatically learn interpolated features corresponding to values of 0.1-0.9 for parameter Z. After training is finished, if a sample having a parameter Z with a value of, for example, 0.1-0.9, the VAE-GAN model may generate some partially bended or interpolated training samples.

Accordingly, in embodiments, the encoder 306 may produce latent representations, and the decoder/generator 314 may generate attack samples. In embodiments, the use of adversarial training using GAN may help VAE to generate wrap attack samples or blended samples with the help of parameter Z. Then, the discriminator 316 may learn to identify between real or bona fide samples and synthetic attack samples.

In embodiments, one or more of mean vector 308, standard deviation vector 310, vector 312 (which may be modified by synthetic attack parameter Z), and any other output of encoder 306 may be provided as input for decoder/generator 314. An output of decoder/generator 314 may be synthetic attack samples $\hat{X}$. In embodiments, synthetic attack samples $\hat{X}$ may include synthetic attack images corresponding to bona fide face images input into encoder 306. For example, the synthetic attack images may include synthetic wrap attack images, which may correspond to the bona fide face images and may have characteristics corresponding to wrap attacks.

In embodiments, bona fide samples X and synthetic attack samples $\hat{X}$ may be provided as input for discriminator 316. Discriminator 316 may perform learning or training based on bona fide samples X and synthetic attack samples $\hat{X}$ in order to provide a real/fake determination which indicates whether a particular input is real or fake. In embodiments, this real/fake determination may correspond to a determination of whether an input image is a bona fide face image, or a synthetic wrap attack image. In embodiments, one or more real/fake determinations provided by discriminator 316 may be used to further train encoder 306 and decoder/generator 314 in order to produce improved synthetic attack samples $\hat{X}$.

In embodiments, after synthetic attack samples $\hat{X}$ have been generated, dataset generating system 300 may generate a training dataset based on bona fide samples X and synthetic attack samples $\hat{X}$. In embodiments, the training dataset may include bona fide samples X and synthetic attack samples $\hat{X}$. In embodiments, the training dataset may be a liveness detection training dataset, bona fide samples X may be bona fide face images, and synthetic attack samples $\hat{X}$ may be synthetic images, for example synthetic wrap attack images.

Although dataset generating system 300 is described above as including NN elements corresponding to a VAE-GAN, embodiments are not limited thereto. In embodiments dataset generating system 300 may include any other type of NN elements, for example a GAN, a recurrent NN (RNN), a convolutional NN (CNN), or a self-organizing map (SOM).

Figure 4A:
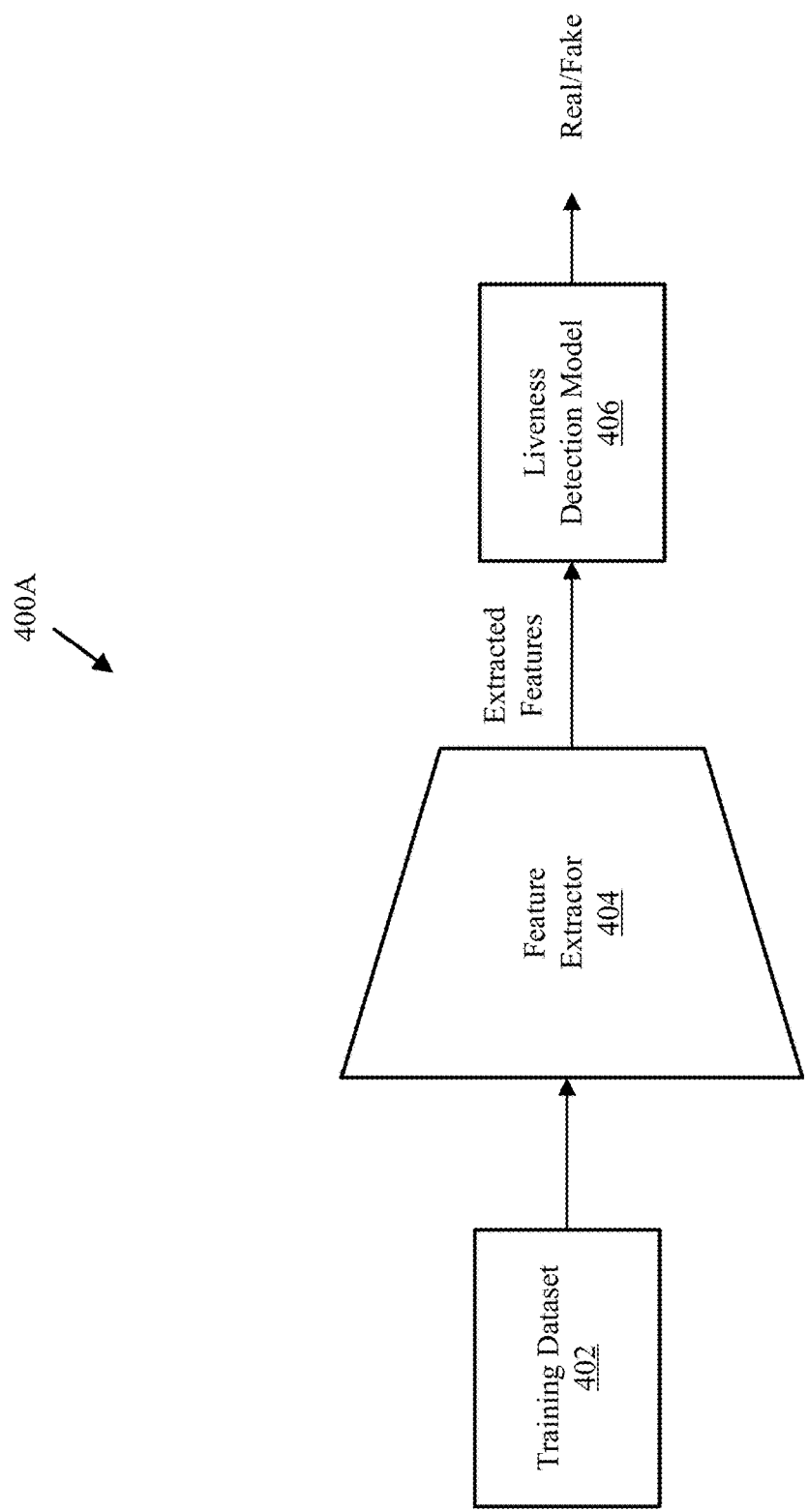
FIGS. 4A-4C are a block diagrams of example training systems for training a liveness detection model, according to embodiments.
Figure 4B:
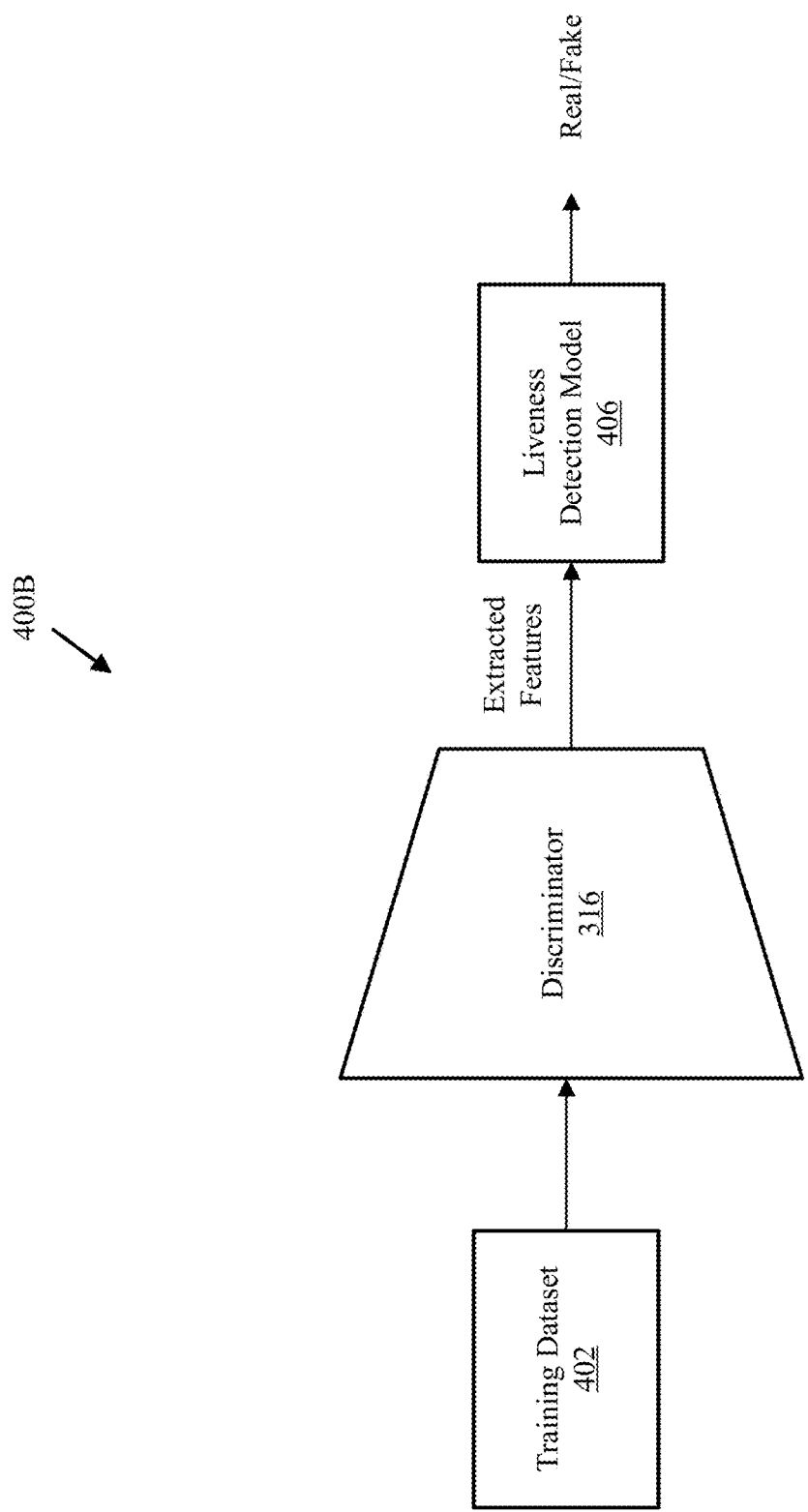
Figure 4C:
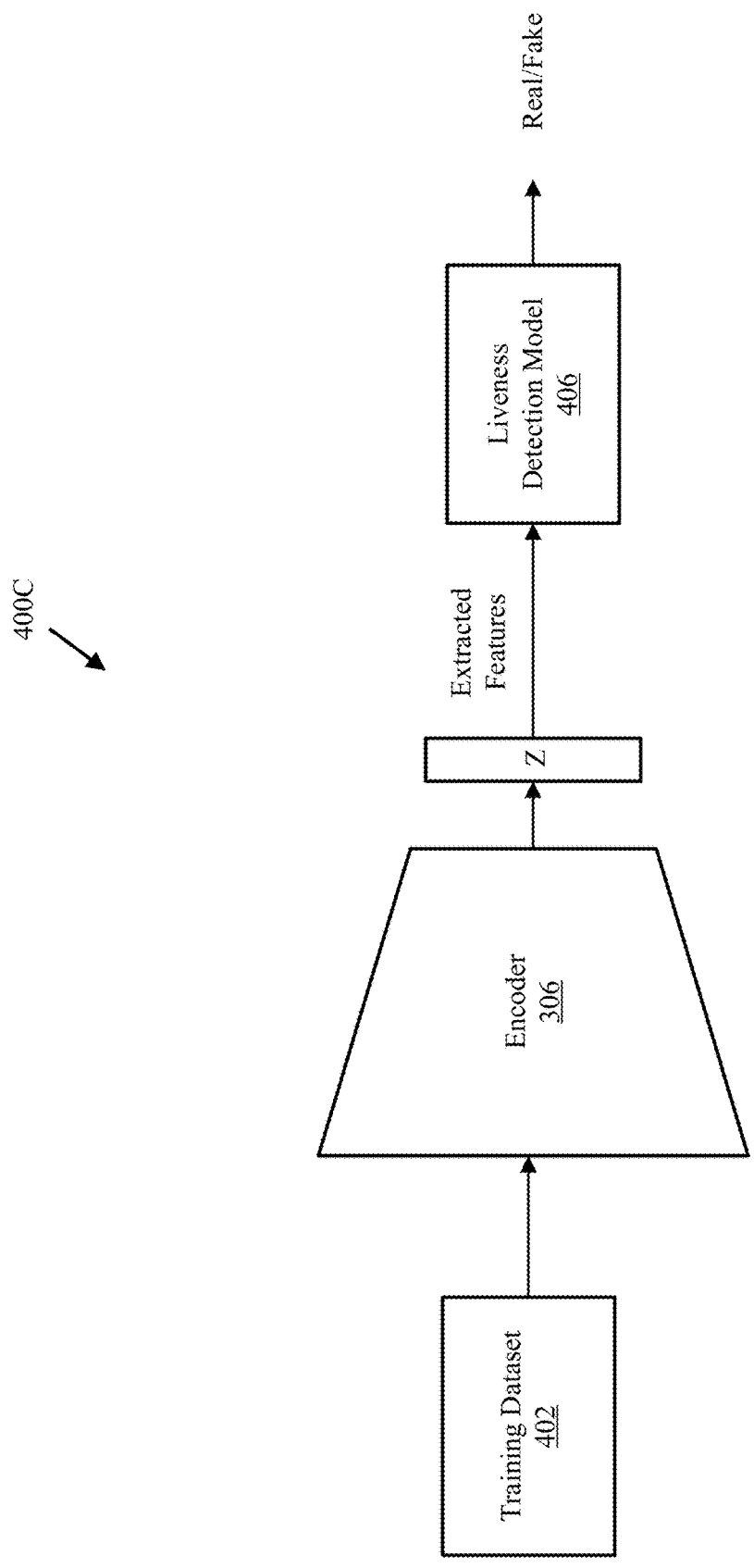

FIGS. 4A-4C are a block diagrams of example training systems for training a liveness detection model, according to embodiments.

As shown in FIG. 4A, training dataset 402 may be provided as an input to training system 400A. In embodiments, training dataset 402 may correspond to the training dataset generated by dataset generating system 300, as discussed above. For example, training dataset 402 may include bona fide samples X such as bona fide face images, as well as synthetic attack samples $\hat{X}$ such as synthetic wrap attack images.

In embodiments, samples from training dataset 402 may be provided to feature extractor 404, which may provide features extracted from the samples to liveness detection model 406. Liveness detection model 406 may perform learning or training on the extracted features and/or training dataset 402, based on a real/fake determination which indicates whether a particular input is real or fake. For example, based on training dataset 402 being a liveness detection training dataset which includes bona fide face images and synthetic wrap attack images, liveness detection model 406 may be trained by training system 400A to provide a real/fake determination which indicates whether a particular image is a bona fide face image or an attack image such as a wrap attack image.

In embodiments, liveness detection model 406 may be a machine learning and/or NN model, or otherwise include machine learning and/or NN elements. For example, liveness detection model 406 may include a support vector machine (SVM) or support vector classifier, however embodiments are not limited thereto, and other machine learning methods may be used.

In embodiments, because the VAE-GAN elements described above may capture and model the dominant structural information and distribution of bona fide samples and attack samples, the training dataset generated by the VAE-GAN elements may enable liveness detection model 406 to learn and differentiate between their latent features.

As can be seen in FIGS. 4B-4C, training system 400B and training system 400C may be similar to training system 400A, except that training system 400B and training system 400C may use one or more elements of dataset generating system 300 to perform one or more of the functions of feature extractor 404. For convenience, duplicative description of some elements illustrated in FIGS. 4B-4C may be omitted.

In embodiments, when discriminator 316 is trained as discussed above with respect to FIG. 3, discriminator network 316 may learn to identify bona fide samples X and synthetic attack samples $\hat{X}$. Because the VAE elements of dataset generating system 300 may be trained on bona fide samples only to generate the synthetic attack samples $\hat{X}$, it can be assumed that discriminator 316 can extract robust discriminating features that can identify bona fide and artefact samples. Therefore, the features extracted from the last layer of discriminator 316 may be capable of capturing distinctive features of bona fide samples and attack samples. Therefore, as shown in FIG. 4B, training system 400B may use discriminator 316 to perform the functions of feature extractor 404. In other words, samples from training dataset 402 may be provided to discriminator 316, which may provide features extracted from the samples to liveness detection model 406.

In addition, as shown in FIG. 4C, training system 400C may use encoder 306, with its output modified by parameter Z, to perform the functions of feature extractor 404. In other words, samples from training dataset 402 may be provided to encoder 306, with its output modified by parameter Z, which may provide features extracted from the samples to liveness detection model 406.

Although training systems 400A-400C are illustrated as including various elements for feature extraction, embodiments are not limited thereto. For example, in embodiments, samples from training dataset 402 may be provided directly to liveness detection model 406, which may perform learning or training directly on the samples from training dataset 402.

Figure 5A:
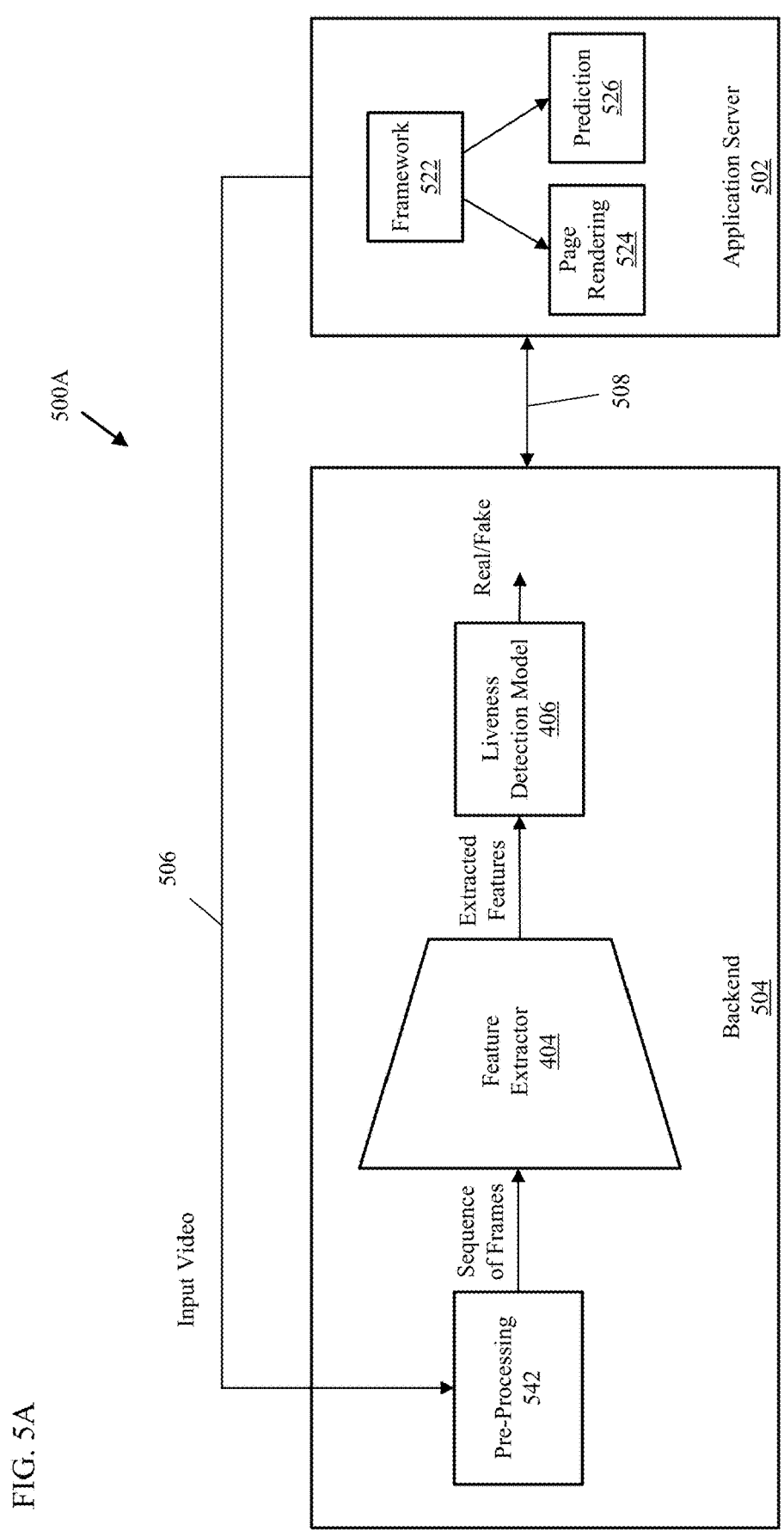
FIGS. 5A-5C are a block diagrams of example liveness detection systems, according to embodiments.
Figure 5B:
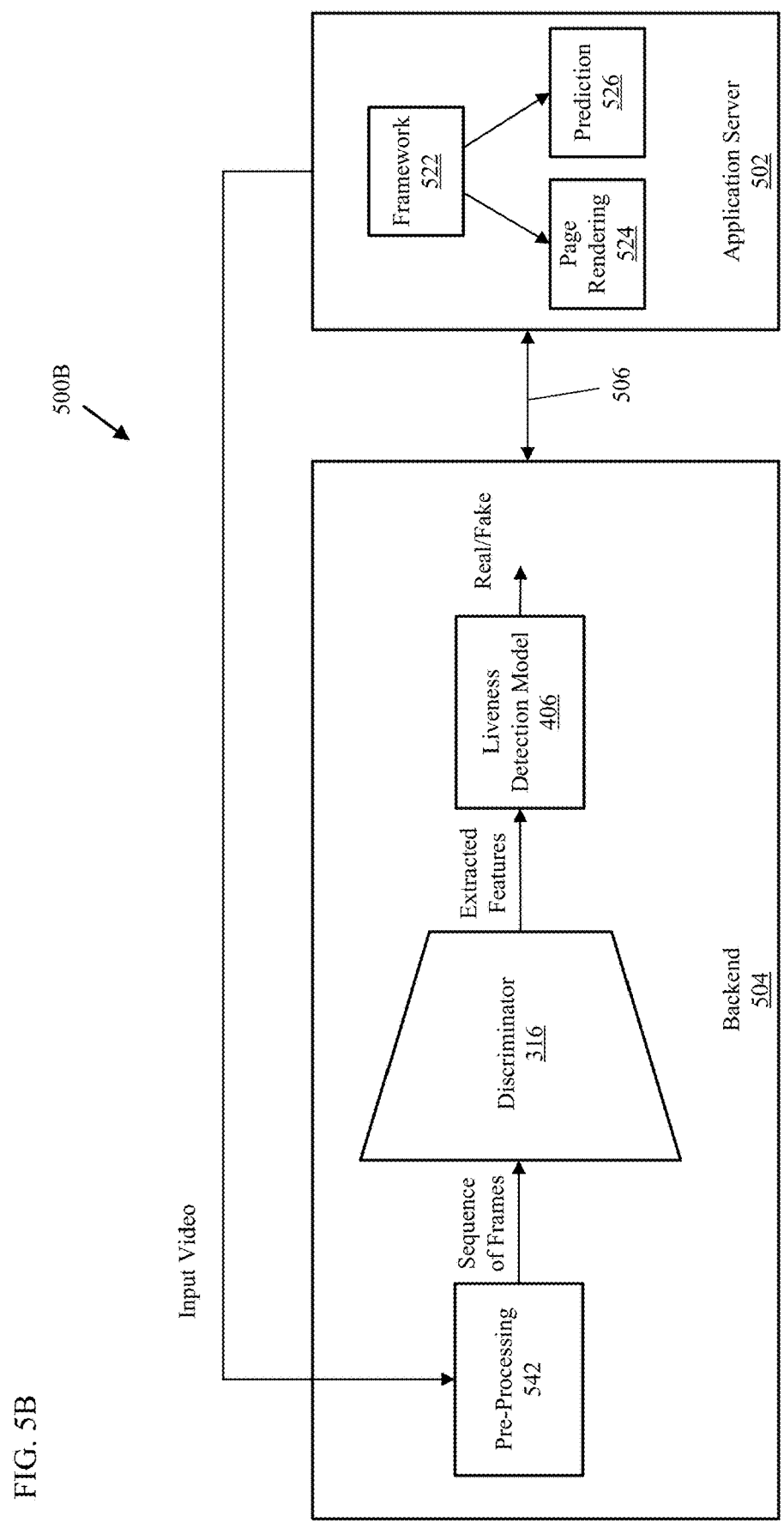
Figure 5C:
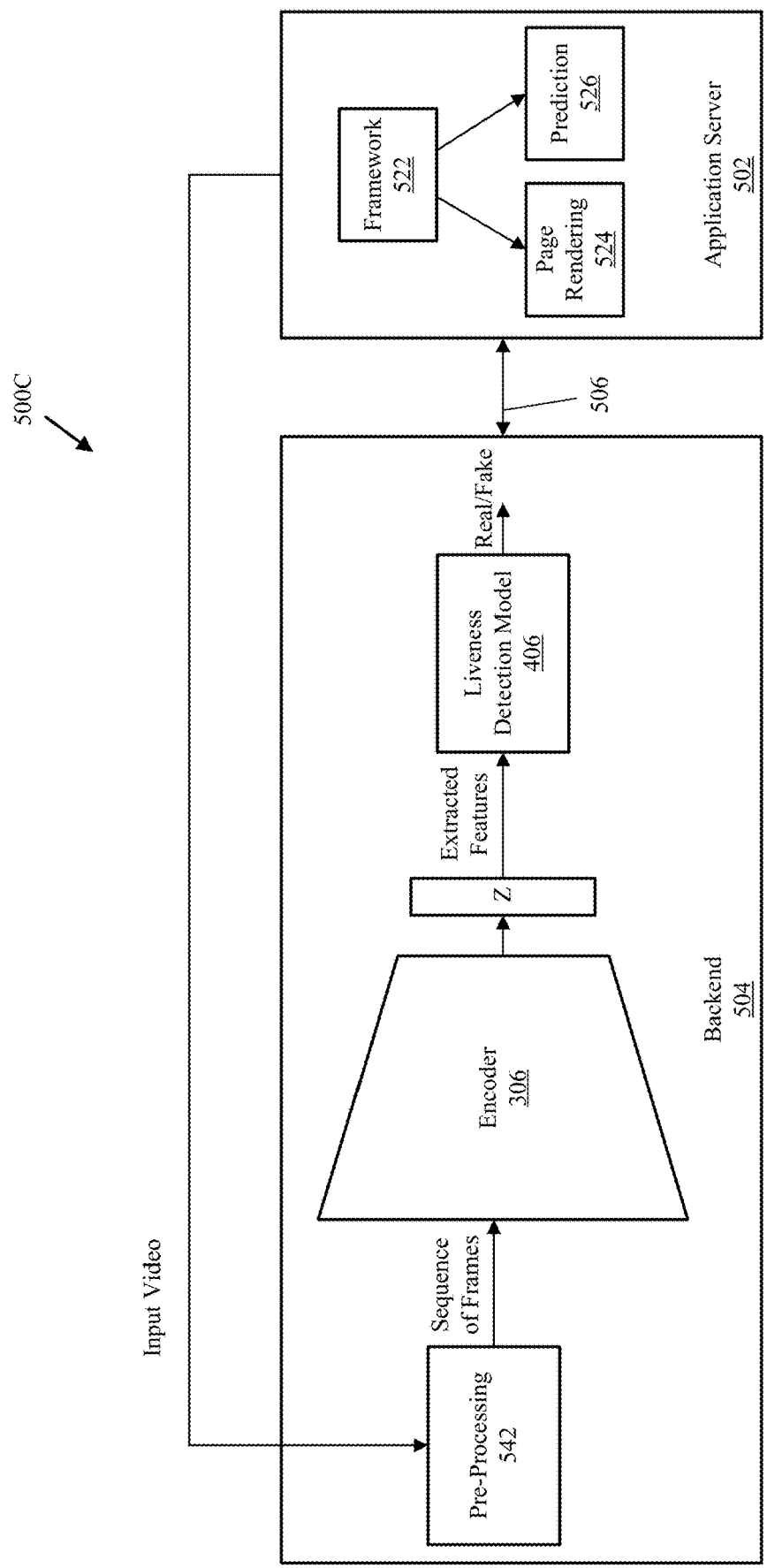

FIGS. 5A-5C are a block diagrams of example liveness detection systems, according to embodiments.

As shown in FIG. 5A, liveness detection system 500A may include an application server 502, which may communicate through at least one of link 506 and link 508 with a backend 504, which may be for example a server. In embodiments, application server 502 may communicate with backend 504 using, for example, one or more of hypertext transfer protocol (HTTP) requests and asynchronous JavaScript and XML (AJAX) requests, or using any other communication scheme as desired.

Application server 502 may provide an input video to backend 504 and request that backend 504 perform liveness detection on the input video. The input video may be provided to pre-processing module 542, which may perform pre-processing on the input video to generate a sequence of frames. In embodiments, pre-processing module 542 may be similar to pre-processing module 304, and may perform similar operations such as such as face and landmark detection, scaling, cropping of facial regions, and normalization to restrict the dynamic range of input RGB images to a particular range, for example [0,255]. In embodiments, input video may be pre-processed to increase the suitability of the sequence of frames as input for liveness detection. In embodiments, pre-processing module 542 may include NN elements, although embodiments are not limited thereto. For example, pre-processing module 542 may include elements corresponding to a MTCNN, or any other type of NN. In embodiments, pre-processing module 542 may detect one or more of a face and facial landmarks, and then generate the sequence of frames to include the detected face, for example by cropping the input video. In embodiments, the pre-processing operations may instead be performed by another element, for example an element included in application server 502.

After pre-processing, the sequence of frames may be provided as input for feature extractor 404, which may provide features extracted from the samples to liveness detection model 406. Liveness detection model 406 may perform liveness detection on the pre-processed sequence of frames, and may provide a real/fake determination based on one or more frames of the pre-processed sequence of frames. For example, the real/fake determination may indicate whether one or more frames of the sequence of frames includes real or bona fide image of a face or an attack image such as a wrap attack image.

After liveness detection model 406 outputs the real/fake determination, the real/fake determination may be provided to application server 502. In embodiments, application server 502 may include framework 502, which may operate page rendering module 524 and prediction module 526. In embodiments, page rendering module 524 and prediction module 526 may correspond to, for example, application programming interfaces. In embodiments, page rendering module 524 may render, for example, a page such as a web page, and application server 502 may provide the rendered page to a user. The page may display one or more of a video corresponding to the input video, and a user interface element allowing a user to request liveness detection. Based on the request for liveness detection being received, prediction module 526 may provide the input video to the backend 504, and after application server 502 receives the real/fake determination, page rendering module 524 may update the rendered page to include information corresponding to the real/fake determination.

In embodiments, backend 504 may provide additional information to application server 502 along with the real/fake determination. For example, information corresponding to the extracted features may be provided to application server 502, and page rendering module 524 may update the rendered page to include this information. The information corresponding to the extracted features may be, for example, information indicating a location of a face detected in the image, and page rendering module 524 may render a face bounding box to display on the rendered page.

As can be seen in FIGS. 5B-5C, liveness detection system 500B and liveness detection system 500C may be similar to liveness detection system 500A, except that liveness detection system 500B and liveness detection system 500C may use one or more elements of dataset generating system 300 to perform one or more of the functions of feature extractor 404.

For example, as shown in FIG. 5B, liveness detection system 500B may use discriminator 316 to perform the functions of feature extractor 404. In other words, the sequence of frames may be provided to discriminator 316, which may provide features extracted from the sequence of frames to liveness detection model 406. In addition, as shown in FIG. 5C, liveness detection system 500C may use encoder 306, with its output modified by parameter Z, to perform the functions of feature extractor 404. In other words, the sequence of frames may be provided to encoder 306, with its output modified by parameter Z, which may provide features extracted from the sequence of frames to liveness detection model 406. For convenience, duplicative description of other elements illustrated in FIGS. 5B-5C may be omitted.

Figure 6B:
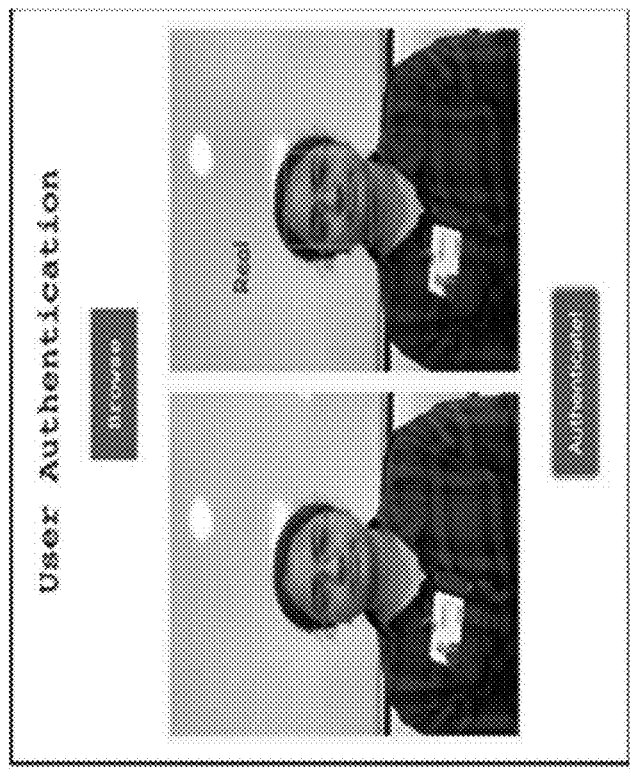
FIGS. 6A-6B illustrate example user interface screens of a liveness detection system, according to embodiments.
Figure 6A:
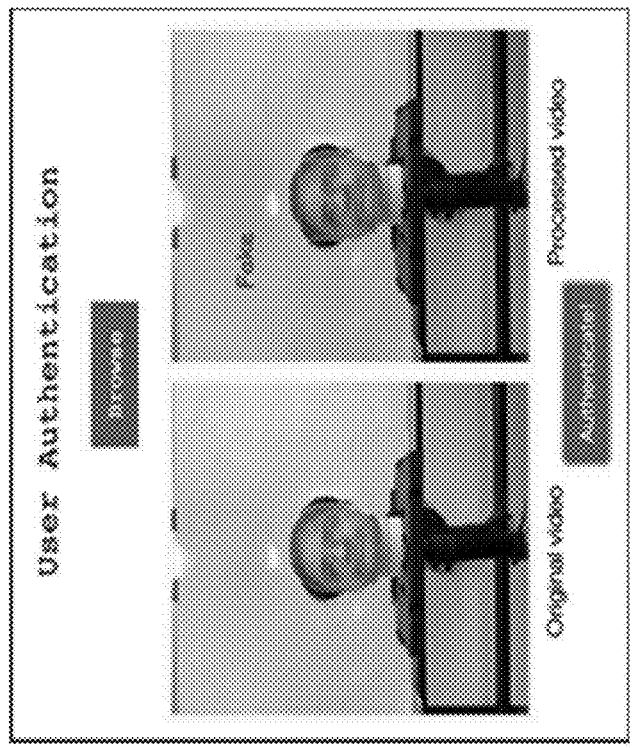

FIGS. 6A-6B illustrate example user interface screens of a liveness detection system, according to embodiments. In embodiments, the user interface screens of FIGS. 6A-6B may correspond to the web page rendered by page rendering module 524. As can be seen in FIGS. 6A-6B, the user interface screens may include one or more frames of an original video of an attack image such as an attack image, and one or more frames of a processed version of the input video, for example after the original video is processed using backend 504 as discussed above with respect to FIGS.

5A-5C. The one or more frames of the processed video may include information corresponding to a real/fake determination made by liveness model 406, for example a label, as well as information corresponding to features extracted from the original video, for example a face bounding box placed around a detected face.

As can be seen in FIG. 6A, based on the original video including a wrap attack image, liveness detection model 406 may output a real/fake determination of "fake", indicating that a wrap attack image is detected. As a result, the processed video displayed on the user interface screen may include a label indicating "fake", and a face bounding box located at a face detected in the wrap attack image.

As can be seen in FIG. 6A, based on the original video including a bona fide face image, liveness detection model 406 may output a real/fake determination of "real", indicating that a bona fide face image is detected. As a result, the processed video displayed on the user interface screen may include a label indicating "real", and a face bounding box located at a face detected in the bona fide face image.

Figure 7:
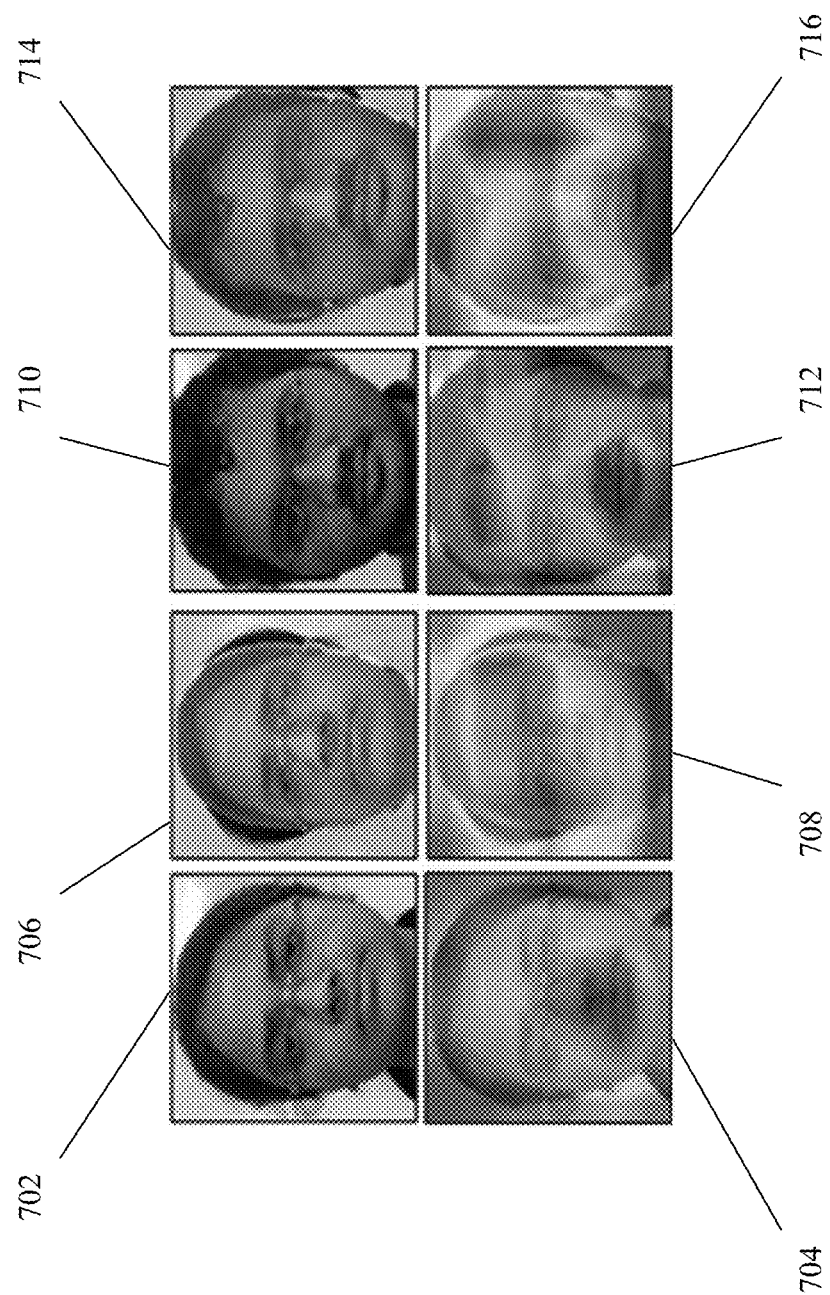
FIG. 7 shows example genuine images and wrap attack images along with corresponding visualizations corresponding to a liveness detection system, according to an embodiment.

FIG. 7 shows example bona fide images and wrap attack images along with corresponding visualizations related to a liveness detection system, according to an embodiment. For example, image 702 may be a bona fide face image, and image 706 may be a wrap attack image corresponding to the bona fide face image of image 702. In addition, image 704 may be a gradient-weighted class activation mapping (Grad-CAM) image corresponding to image 702, and image 708 may be a Grad-CAM image corresponding to image 708. In addition, image 710 may be a bona fide face image, and image 714 may be a wrap attack image corresponding to the bona fide face image of image 710. In addition, image 712 may be a Grad-CAM image corresponding to image 710, and image 716 may be a Grad-CAM image corresponding to image 714.

In general, Grad-CAM images may use the gradients of a target concept, flowing into the final convolutional layer to produce a coarse localization map highlighting important regions in the image. In embodiments, images 702 and 704 may be generated based on information corresponding to, for example, features extracted from images 702 and 706 using feature extractor 404, or features identified as important using one or more of feature extractor 404 and liveness detection model 406.

FIGS. 8A-8G may relate to an experimental setup and experimental results obtained from a liveness detection system consistent with embodiments discussed above with respect to FIGS. 1-7.

Figure 8A:
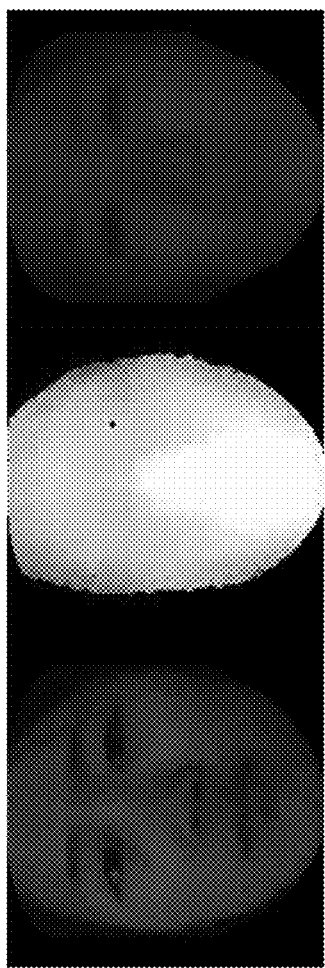
FIGS. 8A-8B show example images from an anti-spoofing dataset, according to an embodiment.
Figure 8B:
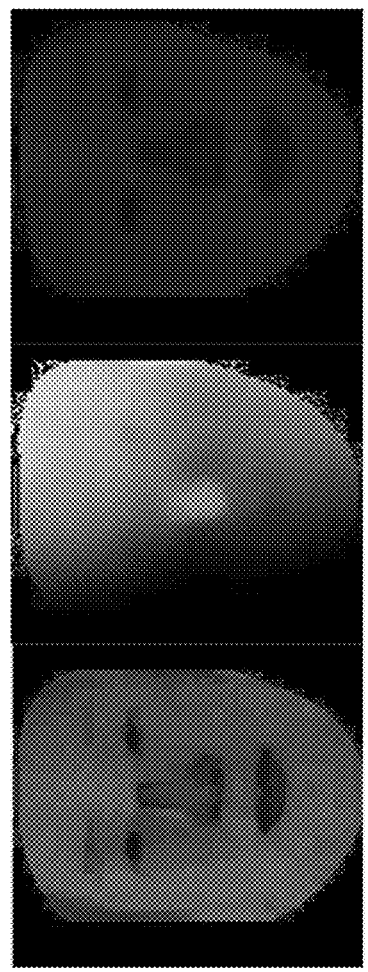

FIGS. 8A-8B show example images from an anti-spoofing dataset, according to an embodiment. In particular, FIG. 8A shows a bona fide sample and FIG. 8B shows an attack sample from the ChaLearn CASIA-SURF dataset, which may be one of the largest publicly available face anti-spoof datasets both in terms of subjects and visual modalities. Specifically, ChaLearn CASIA-SURF consists of 1,000 subjects with 21,000 videos with 3 modalities (RGB, Depth and IR). The bona fide sample and the attack sample include RGB information (left), depth information (middle), and infrared information (right).

Figure 8C:
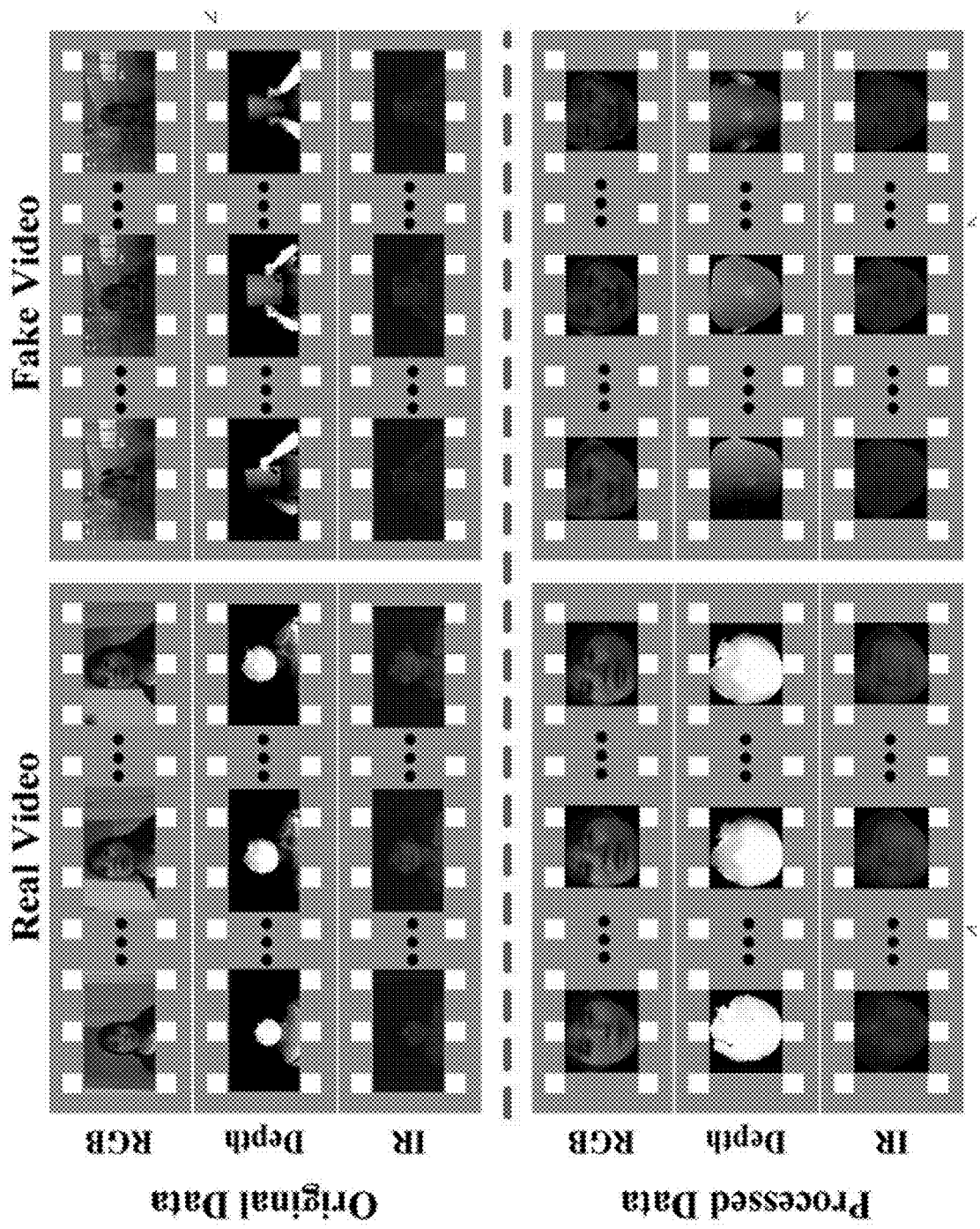
FIG. 8C shows frames of an example video from an anti-spoofing dataset, according to an embodiment.

FIG. 8C shows frames of an example video from an anti-spoofing dataset, according to an embodiment. In particular, FIG. 8C shows frames corresponding to original data and processed data for a real video and fake video included in the ChaLearn CASIA SURF dataset. In general, samples in the ChaLearn CASIA SURF dataset may include 1 live video, and 6 corresponding fake videos related to each of 6 attack styles, which may include a printed flat face image, a curved face image, with cut-outs for the eye area, the nose area, the mouth area, and their combinations. Data acquisition ChaLearn CASIA SURF dataset may be captured via Intel RealSence SR300.

Figure 8D:
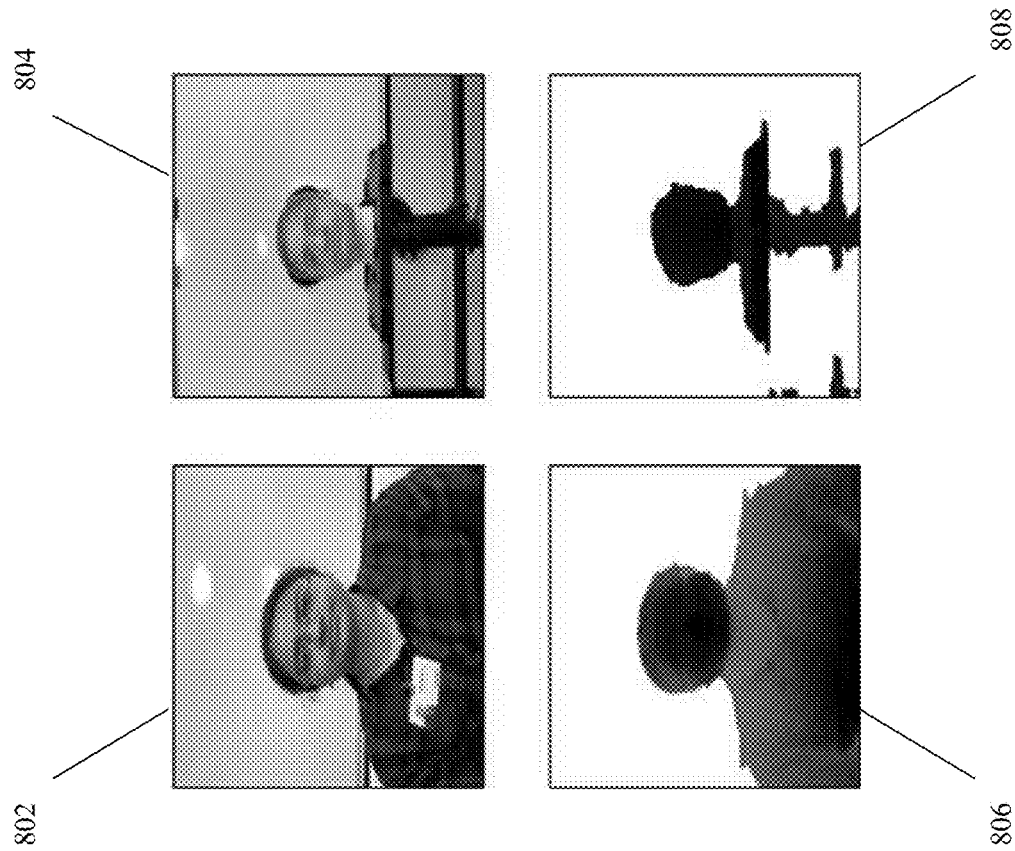
FIG. 8D shows example images from an anti-spoofing dataset, according to an embodiment.

FIG. 8D shows example images from an anti-spoofing dataset, according to an embodiment. In particular, image 802 may be a bona fide face image, and image 804 may be a wrap attack image corresponding to image 802. In addition, image 806 may be a depth-based image corresponding to image 802, and image 818 may be a depth-based image corresponding to image 804. Table 1 below includes details of the creation of the anti-spoofing dataset including images 802-808.

TABLE 1

| | |
|---|---|
| Subjects | 60 |
| Session | 1 |
| Acquisition Device | iPad Pro 11 inch |
| Acquisition Distance | Bona Fide: 35-37 inch & 8-9 inch |
| | Attack: 35-37 inch & 23-25 inch |
| Duration | 11 Seconds |
| Modality | RGB, Depth |
| Printed Masks | Plain & Glossy A4 Prints |
| Total Videos | 628 |
| Bonafide/Attack | 148/480 Videos |
| Videos | (RGB + Depth) |

FIG. 8E shows experimental results corresponding to a liveness detection system according to an embodiment. In particular, FIG. 8E shows results of an experimental test of a liveness detection system consistent with embodiments discussed above with respect to FIGS. 1-7, and further discussed below with respect to FIGS. 9A-9B. These results are expressed in terms of ISO/IEC 30107-3:2017 metrics for biometric presentation attack detection. The metrics include may Attack Presentation Classification Error Rate (APCER), which may be expressed according to Equation 1 below:

$$APCER = \frac{1}{N_{PAI}} \sum_{i=1}^{N_{PAI}} (1 - Res_i) \quad \text{(Equation 1)}$$

In Equation 1 above, $N_{PAI}$ is the number of the attack presentations, and $Res_i$ takes the value 1 if the $i^{th}$ presentation is classified as an attack presentation and 0 if classified as bona fide presentation.

The metrics may further include Bona Fide Presentation Classification Error Rate (BPCER), which may be expressed according to Equation 2 below:

$$BPCER = \frac{\sum_{i=}^{N_{BF}} (1 - Res_i)}{N_{BF}} \quad \text{(Equation 2)}$$

In Equation 2 above, $N_{BF}$ is the total number of the bona fide presentations.

The metrics may further include Average Classification Error Rate (ACER), which may be expressed according to Equation 3 below $$ACER = \frac{APCER + BPCER}{2} \quad \text{(Equation 3)}$$

The metrics may further include Equal Error Rate (EER), which may be expressed according to Equation 4 below:

$$EER = APCER = BPCER \quad \text{(Equation 4)}$$

Table 2 below shows details of the experimental setup corresponding to the results shown in FIG. 8E.

TABLE 2

| | Database |
|---|---|
| Training | FRGC |
| | SWAN-MBD |
| Evaluation | CASIA-SURF |
| | WRAP |
| Image Size | 128 × 128 |
| Latent Vector Size | 512 |
| Feature Size | 8192 |

As shown in FIG. 8E, results labeled "print paper mask" and "glossy paper mask" were obtained by testing the liveness detection system using the anti-spoofing dataset discussed above with respect to FIG. 8D as input, and results labeled "CASIA-SURF" were obtained by testing the liveness detection system using the anti-spoofing dataset discussed above with respect to FIG. 8A-8C as input.

Figure 8G:
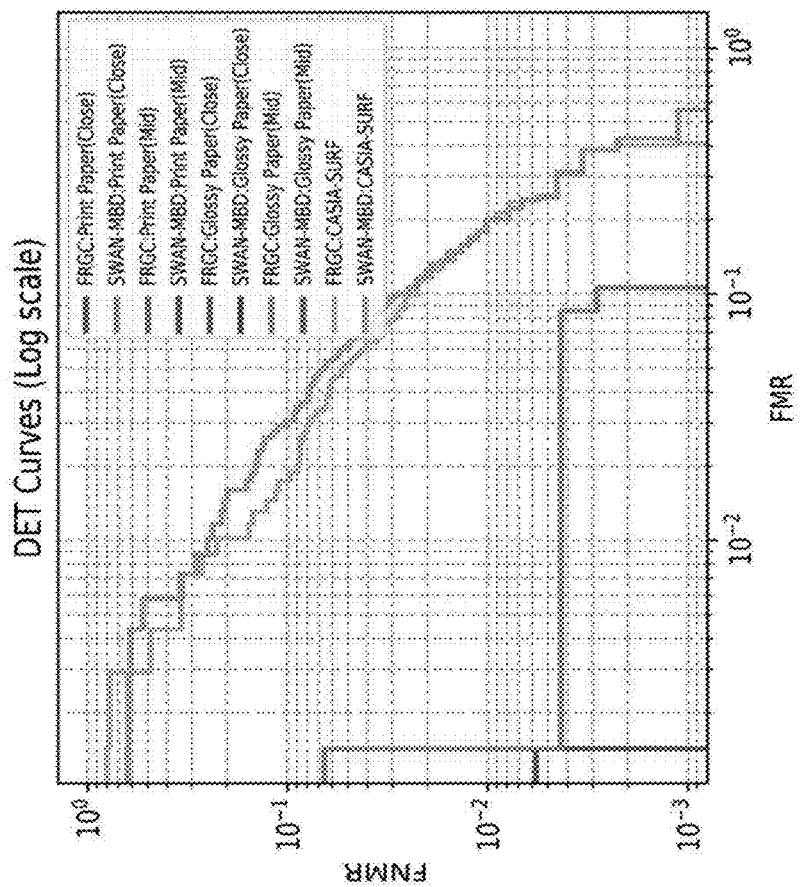
FIGS. 8F-8G show experimental results corresponding to a liveness detection system according to an embodiment.
Figure 8F:
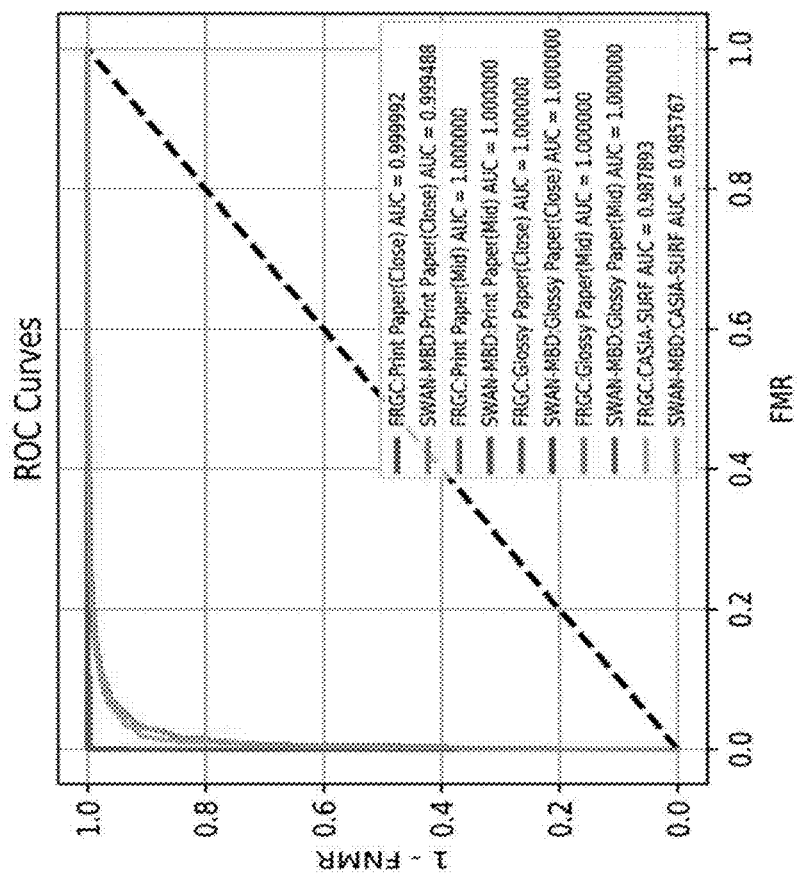

FIGS. 8F-8G show experimental results corresponding to a liveness detection system according to an embodiment. In particular, FIG. 8F shows a receiver operating characteristic (ROC) curve of a cross-database evaluation of different databases, and FIG. 8E shows a corresponding detection error tradeoff (DET) curve.

FIG. 9A is a flow chart of an example process 900A for generating a liveness detection training dataset and training a liveness detection model. In some implementations, one or more process blocks of FIG. 9A may be performed by one or more elements of dataset generating system 300 and training systems 400A-400C. In some implementations, one or more process blocks of FIG. 9A may be performed by another device or a group of devices separate from or including generating system 300 and training system 400, such as platform 220 and user device 210.

As shown in FIG. 9A, process 900A may include obtaining a plurality of real images of faces (block 912). In embodiments, the plurality of real images of faces may correspond to at least one of input data 302 and bona fide samples X.

As further shown in FIG. 9A, process 900A may include providing the plurality of real images to a neural network (block 914). In embodiments, the term neural network may refer to at least one of a deep NN, a deep learning technique, or any other type of machine learning technique. In embodiments, the neural network may include at least one of the NN elements of dataset generating system 300, for example encoder 306, decoder/generator 314, and discriminator 316.

As further shown in FIG. 9A, process 900A may include generating a plurality of synthetic images corresponding to the plurality of real images based on an output of the neural network. (block 916). In embodiments, the plurality of synthetic images may correspond to synthetic attack samples X̃.

As further shown in FIG. 9A, process 900A may include training a liveness detection model based on the plurality of real images and the plurality of synthetic images, wherein the liveness detection model is used to perform liveness detection by determining whether an input image of a face comprises a live image of the face (block 918). In embodiments, the liveness detection model may correspond to liveness detection model 406.

In embodiments, the neural network may include a variational autoencoder—generative adversarial network (VAE-GAN).

In embodiments, the plurality of synthetic images may include at least one synthetic wrap attack image.

In embodiments, the at least one synthetic wrap attack image may be generated using a wrap attack parameter.

In embodiments, a first value of the wrap attack parameter may indicate that the at least one synthetic wrap attack image may include a planar face image corresponding to a flat mask, and a second value of the wrap attack parameter may indicate that the at least one synthetic wrap attack image may include a wrapped face image corresponding to a wrapped mask.

In embodiments, the plurality of real images may include a plurality of first real images having a first value of the wrap attack parameter, and a second plurality of real images having a second value of the wrap attack parameter, and based on the plurality of first real images and the plurality of second real images, the at least one synthetic wrap attack image may be generated to have a third value of the wrap attack parameter.

In embodiments, the training of the liveness detection model may include: extracting features from the plurality of real images and the plurality of synthetic images using a feature extractor; and training the liveness detection model based on the extracted features.

In embodiments, a discriminator included in the neural network may be used as the feature extractor after the plurality of synthetic images are generated.

In embodiments, the liveness detection model may include a support vector machine (SVM).

Figure 9B:
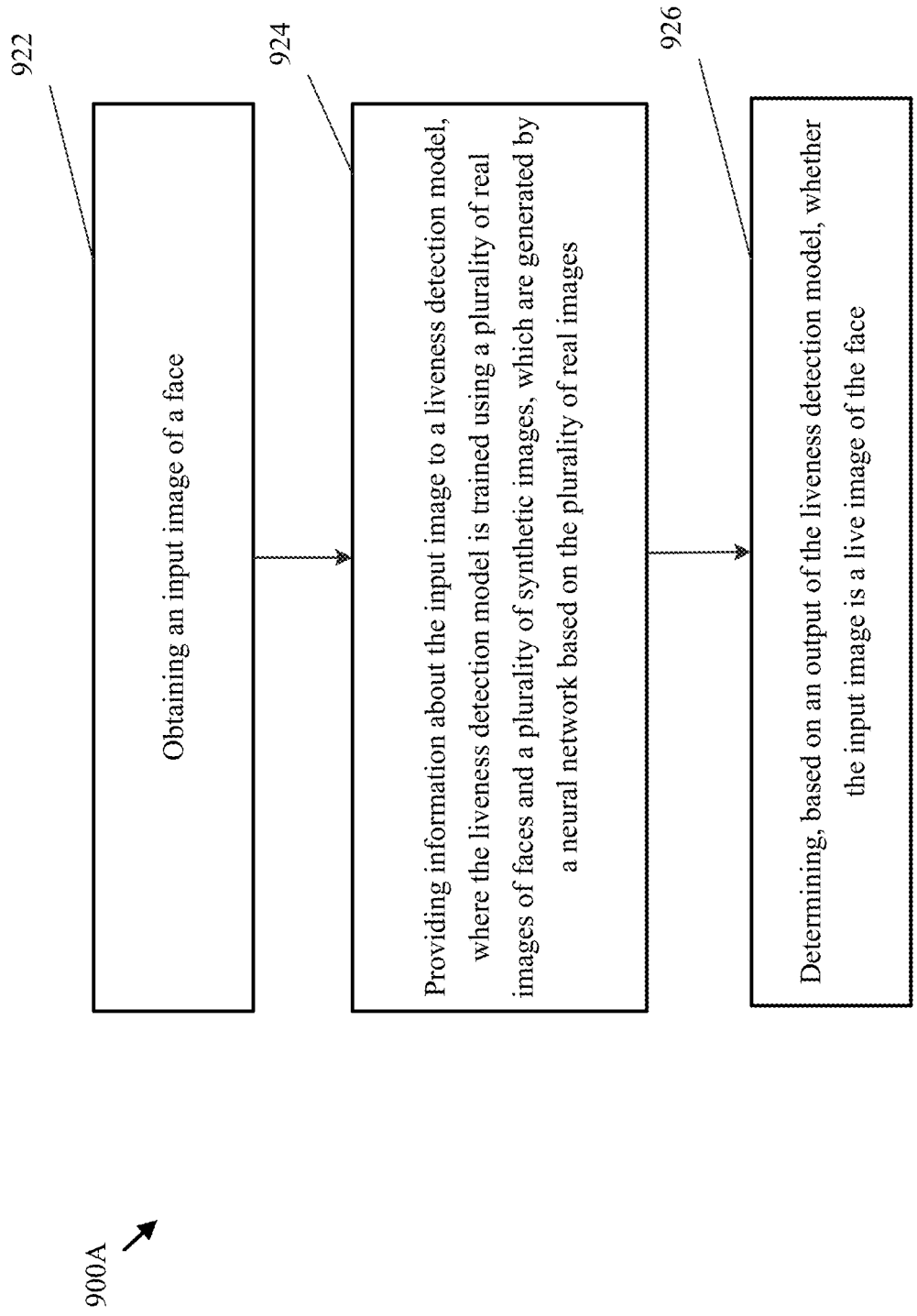
FIG. 9B is a flowchart of a liveness detection method according to an embodiment.

FIG. 9B is a flow chart of an example process 900B for liveness detection. In some implementations, one or more process blocks of FIG. 9B may be performed by one or more elements of liveness detection systems 500A-500C. In some implementations, one or more process blocks of FIG. 9B may be performed by another device or a group of devices separate from or including liveness detection systems 500A-500C, such as platform 220 and user device 210.

As shown in FIG. 9B, process 900B may include obtaining an input image of a face (block 922). In embodiments, the input image of the face may correspond to at least one of the input video and the sequence of frames discussed above with respect to FIGS. 5A-5C.

As further shown in FIG. 9B, process 900B may include providing information about the input image to a liveness detection model (block 924). In embodiments, the liveness detection model may be trained using a plurality of real images of faces and a plurality of synthetic images, which are generated by a neural network based on the plurality of real images. In embodiments, the liveness detection model may correspond to liveness detection model 406. In embodiments, the neural network may include at least one of the NN elements of dataset generating system 300, for example encoder 306, decoder/generator 314, and discriminator 316.

As further shown in FIG. 9B, process 900B may include determining, based on an output of the liveness detection model, whether the input image is a live image of the face (block 926).

In embodiments, the information about the input image may include at least one feature of the input image, and the at least one feature may be extracted using a feature extractor.

In embodiments, the feature extractor may include a discriminator included in the neural network after the plurality of synthetic images are generated.

Although FIGS. 9A-9B show example blocks of processes 900A and 900B, in some implementations, processes 900A and 900B may include additional blocks, fewer blocks, different blocks, or differently arranged blocks than those depicted in FIGS. 9A-9B. Additionally, or alternatively, two or more of the blocks of processes 900A and 900B may be performed in parallel.

Embodiments discussed above may relate to a VAE-GAN based model architecture for wrap attack detection, which may be heavily based on live or bona fide presentations only. Embodiments may be trained on any face recognition database, which may act as bona fide samples, and then independently generate attack samples, which may allow a discriminator to generalize the network parameters and extract discriminative features of bona fide and attack classes. Embodiments may utilize a VAE-GAN architecture to obtain deep generative representation learning to model the wrap attack images, and a parameter Z may control wrapped face image curvature. A VAE-GAN discriminator may assist a generator to generate sophisticated attack samples, while discriminating between the original and generated samples. Therefore, features extracted from a last layer of the discriminator may be capable of capturing the distinctive features of the bona fide and attack samples. In embodiments, the VAE-GAN may capture and model dominant structural information and distributions of bona fide and attack samples, which may enable an SVM to learn and differentiate between their latent features.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

While one or more exemplary embodiments have been described above with reference to the figures, it will be understood by those of ordinary skill in the art that various changes in form and details may be made therein without departing from the spirit and scope as defined at least in part by the following claims.

What is claimed is:

1. A method of training a liveness detection system, the method comprising:
   obtaining a plurality of real images of faces;
   providing the plurality of real images to a neural network;
   generating a plurality of synthetic images corresponding to the plurality of real images based on an output of the neural network; and
   training a liveness detection model based on the plurality of real images and the plurality of synthetic images,
   wherein the liveness detection model is used to perform liveness detection by determining whether an input image of a face comprises a live image of the face,
   wherein, after the plurality of synthetic images are generated, at least a portion of the neural network is used as a feature extractor to extract features that are used to train the liveness detection model,
   wherein the plurality of synthetic images comprises at least one synthetic wrap attack image,
   wherein the at least one synthetic wrap attack image is generated using a wrap attack parameter, and
   wherein the wrap attack parameter indicates an amount of curvature included in the at least one synthetic wrap attack image.

2. The method of claim 1, wherein the neural network comprises a variational autoencoder-generative adversarial network (VAE-GAN).

3. The method of claim 1, wherein a first value of the wrap attack parameter indicates that the at least one synthetic wrap attack image comprises a planar face image corresponding to a flat mask, and
   wherein a second value of the wrap attack parameter indicates that the at least one synthetic wrap attack image comprises a wrapped face image corresponding to a wrapped mask.

4. The method of claim 1, wherein the plurality of real images includes a plurality of first real images having a first value of the wrap attack parameter, and a plurality of second real images having a second value of the wrap attack parameter, and
   wherein, based on the plurality of first real images and the plurality of second real images, the at least one synthetic wrap attack image is generated to have a third value of the wrap attack parameter.

5. The method of claim 1, wherein the training of the liveness detection model comprises:
   extracting the features from the plurality of real images and the plurality of synthetic images using the feature extractor; and
   training the liveness detection model based on the extracted features.

6. The method of claim 5, wherein a discriminator included in the neural network is used as the feature extractor after the plurality of synthetic images are generated.

7. The method of claim 1, wherein the liveness detection model comprises a support vector machine (SVM).

8. The method of claim 1, wherein the liveness detection model comprises a machine learning model that is different from the neural network, and
wherein a training dataset used to train the liveness detection model comprises the plurality of real images and the plurality of synthetic images.

9. A method of performing liveness detection, the method comprising:
obtaining an input image of a face;
providing information about the input image to a liveness detection model;
determining, based on an output of the liveness detection model, whether the input image is a live image of the face,
wherein the liveness detection model is trained using a plurality of real images of faces and a plurality of synthetic images, and
wherein the plurality of synthetic images are generated by a neural network based on the plurality of real images,
wherein, after the plurality of synthetic images are generated, at least a portion of the neural network is used as a feature extractor to extract features that are used to train the liveness detection model,
wherein the plurality of synthetic images comprises at least one synthetic wrap attack image,
wherein the at least one synthetic wrap attack image is generated using a wrap attack parameter, and
wherein the wrap attack parameter indicates an amount of curvature included in the at least one synthetic wrap attack image.

10. The method of claim 9, wherein the information about the input image comprises at least one feature of the input image, and wherein the at least one feature is extracted using the feature extractor.

11. The method of claim 10, wherein the feature extractor comprises a discriminator included in the neural network after the plurality of synthetic images are generated.

12. The method of claim 9, wherein the input image of the face comprises at least one frame of a video.

13. A device for performing liveness detection, the device comprising:
a memory configured to store instructions; and
at least one processor configured to execute the instructions to:
obtain an input image of a face;
provide information about the input image to a liveness detection model;
determine, based on an output of the liveness detection model, whether the input image is a live image of the face,
wherein the liveness detection model is trained using a plurality of real images of faces and a plurality of synthetic images, and
wherein the plurality of synthetic images are generated by a neural network based on the plurality of real images,
wherein, after the plurality of synthetic images are generated, at least a portion of the neural network is used as a feature extractor to extract features that are used to train the liveness detection model,
wherein the plurality of synthetic images comprises at least one synthetic wrap attack image,
wherein the at least one synthetic wrap attack image is generated using a wrap attack parameter, and
wherein the wrap attack parameter indicates an amount of curvature included in the at least one synthetic wrap attack image.

14. The device of claim 13, wherein the information about the input image comprises at least one feature of the input image, and
wherein the at least one feature is extracted using the feature extractor.

15. The device of claim 14, wherein the feature extractor comprises a discriminator included in the neural network after the plurality of synthetic images are generated.

16. A non-transitory computer-readable medium storing instructions that, when executed by one or more processors of a device for performing liveness detection, cause the one or more processors to:
obtain an input image of a face;
provide information about the input image to a liveness detection model;
determine, based on an output of the liveness detection model, whether the input image is a live image of the face,
wherein the liveness detection model is trained using a plurality of real images of faces and a plurality of synthetic images,
wherein the plurality of synthetic images are generated by a neural network based on the plurality of real images,
wherein, after the plurality of synthetic images are generated, at least a portion of the neural network is used as a feature extractor to extract features that are used to train the liveness detection model,
wherein the plurality of synthetic images comprises at least one synthetic wrap attack image,
wherein the at least one synthetic wrap attack image is generated using a wrap attack parameter, and
wherein the wrap attack parameter indicates an amount of curvature included in the at least one synthetic wrap attack image.

17. The non-transitory computer-readable medium of claim 16, wherein the information about the input image comprises at least one feature of the input image, and
wherein the at least one feature is extracted using the feature extractor.

18. The non-transitory computer-readable medium of claim 17, wherein the feature extractor comprises a discriminator included in the neural network after the plurality of synthetic images are generated.

* * * * *